United States Patent
Dai et al.

(10) Patent No.: US 10,391,472 B2
(45) Date of Patent: Aug. 27, 2019

(54) SURFACE-FUNCTIONALIZED POLYOLEFIN FIBERS AND THEIR USE IN METHODS FOR EXTRACTING METAL IONS FROM LIQUID SOLUTIONS

(71) Applicants: UT-Battelle, LLC, Oak Ridge, TN (US); University of Tennessee Research Foundation, Knoxville, TN (US)

(72) Inventors: Sheng Dai, Knoxville, TN (US); Suree Brown, Dandridge, TN (US); Tomonori Saito, Knoxville, TN (US)

(73) Assignees: UT-Battelle, LLC, Oak Ridge, TN (US); University of Tennessee Research Foundation, Knoxville, TN (US)

(*) Notice: Subject to any disclaimer, the term of this patent is extended or adjusted under 35 U.S.C. 154(b) by 504 days.

(21) Appl. No.: 15/154,437

(22) Filed: May 13, 2016

(65) Prior Publication Data

US 2017/0326530 A1    Nov. 16, 2017

(51) Int. Cl.
*C02F 1/28*    (2006.01)
*C22B 3/24*    (2006.01)
(Continued)

(52) U.S. Cl.
CPC ...... *B01J 20/28023* (2013.01); *B01D 15/362* (2013.01); *B01J 20/264* (2013.01);
(Continued)

(58) Field of Classification Search
CPC .............. B01J 20/28023; B01J 20/3085; B01J 20/264; C22B 59/00; C22B 3/24; C22B 60/0265; B01D 15/362
See application file for complete search history.

(56) References Cited

U.S. PATENT DOCUMENTS 6,333,078 B1    12/2001   Sugo et al.
9,249,241 B2     2/2016   Dai et al.
(Continued)

FOREIGN PATENT DOCUMENTS

CN          102614842 A      8/2012
WO    WO 2014/031702 A1     2/2014

OTHER PUBLICATIONS

Brown et al., "Uranium Adsorbent Fibers Prepared by Atom-Transfer Radical Polymerization from Chlorinated Polypropylene and Polyethylene Trunk Fibers," Ind. Eng. Chem. Res. 2016, 55, 4130-4138. Published Dec. 10, 2015. (Year: 2015).*

(Continued)

*Primary Examiner* — Anthony J Zimmer
(74) *Attorney, Agent, or Firm* — Scully, Scott, Murphy & Presser, P.C.

(57) ABSTRACT

A fiber useful in the absorption of metal ions from aqueous solutions, the fiber comprising a polyolefin backbone having a diameter of at least 1 micron and having covalently appended on its surface halogen atoms and vinyl-addition polymeric grafts functionalized with metal-binding groups, such as at least one functional group selected from carboxylate, keto, aldo, amino, imino, nitrile, amido, oxime, amidoxime, imide dioxime, and hydroxamate groups. The vinyl-addition polymeric grafts may also be further functionalized with hydrophilic groups different from the metal-binding groups, wherein the hydrophilic groups may be selected from carboxylate, sulfone, sulfonate, phosphonate, alkylammonium, iminium, amide, pyrrolidone, and polyalkyleneglycol groups. Also described are methods for producing the functionalized fibers, and methods for using the functionalized fiber, particularly in extracting metal ions from metal-containing solutions.

31 Claims, 6 Drawing Sheets

(51) Int. Cl.
*B01D 15/36* (2006.01)
*B01J 20/26* (2006.01)
*B01J 20/28* (2006.01)
*B01J 20/30* (2006.01)
*C22B 59/00* (2006.01)
*C22B 60/02* (2006.01)
*C02F 101/00* (2006.01)
*C02F 101/10* (2006.01)

(52) U.S. Cl.
CPC ........... *B01J 20/3085* (2013.01); *C02F 1/285* (2013.01); *C22B 3/24* (2013.01); *C22B 59/00* (2013.01); *C22B 60/0265* (2013.01); *C02F 2101/006* (2013.01); *C02F 2101/10* (2013.01); *Y02P 10/234* (2015.11)

(56) References Cited

U.S. PATENT DOCUMENTS

| | | | |
|---|---|---|---|
| 9,359,320 | B2 | 6/2016 | Oyola et al. |
| 2013/0131275 | A1 | 5/2013 | Tillman et al. |
| 2014/0206532 | A1 | 7/2014 | Janke et al. |

OTHER PUBLICATIONS

Brown et al., "Uranium Adsorbent Fibers Prepared by Atom-Transfer Radical Polymerization (ATRP) from Poly(vinyl chloride)-co-chlorinated Poly(vinyl chloride) (PVC-co-CPVC) Fiber," Ind. Eng. Chem. Res. 2016, 55, 4139-4148. Published Mar. 11, 2016. (Year: 2016).*

Bicak, N. et al., "Graft Copolymerization of Butyl Acrylate and 2-Ethyl Hexyl Acrylate from Labile Chlorines of Poly (vinyl chloride) by Atom Transfer Radical Polymerization", LRP Graft Copolymerizatoin, (2003), pp. 3457-3462.

Bicak, N. et al., "Atom Transfer Graft Copolymerization of 2-Ethyl Hexylacrylate from Labile Chlorines of Poly(vinyl chloride) in an Aqueous Suspension", Labile Chlorines of Poly(vinyl chloride), (2005), pp. 1900-1907.

Das, S. et al., "Chemical aspects of uranium recovery from seawater by amidoximated electron-beam-grafted polypropylene membranes", Desalination, (2008), vol. 23, pp. 243-253.

Gorka, J. et al., "Sonochemical functionalization of mesoporous carbon for uranium extraction from seawater", J. Mater. Chem. A., (2013), vol. 1, pp. 3016-3026.

Kang, S.O. et al., "Cyclic Imide Dioximes: Formation and Hydrolytic Stability", Industrial & Engineering Chemistry Research, (2012), vol. 51, pp. 6619-6624.

Kavakli, P. A. et al., "A Highly Efficient Chelating Polymer for the Adsorpotion of Uranyl and Vanadyl Ions at Low Concentrations", Adsorption, (2004), vol. 10, pp. 309-315.

Percec, V. et al., Metal-Catalyzed Living Radical Graft Copolymerization of Olefins Initiated from the Structural Defects of Poly(vinyl chloride), LRP Graft Copolymerization, (2001), pp. 1120-1135.

Rao, T.P. et al., "Preconcentration techniques for uranium(VI) and thorium(IV) prior to analytical determination—an overview", Talanta, (2006), vol. 68, pp. 1047-1064.

Saito, T. et al., "Uranium recovery from seawater: development of fiber adsorbents prepared via atom-transfer radical polymerization", J. Mater. Chem. A., (2014), pp. 14674-14681.

Vukovic, S. et al., How Amidoxime Binds the Uranyl Cation, Inorg. Chem. (2012), vol. 51, pp. 3855-3859.

* cited by examiner

SURFACE-FUNCTIONALIZED POLYOLEFIN FIBERS AND THEIR USE IN METHODS FOR EXTRACTING METAL IONS FROM LIQUID SOLUTIONS

This invention was made with government support under Prime Contract No. DE-AC05-00OR22725 awarded by the U.S. Department of Energy. The government has certain rights in the invention.

FIELD OF THE INVENTION

The present invention relates to the field of surface-functionalized polyolefin fibers and their use in extracting metal ions from liquid solutions.

BACKGROUND OF THE INVENTION

Fibrous adsorbents have been widely used for recovering metals from aqueous systems, such as seawater, fresh water, wastewater, drinking water, ultrapure water, and other less common types of waters, such as hot spring water and water rich in precious metals. Many of the fibrous adsorbents used for the extraction of metals have a polymeric backbone (trunk) with functionalized polymeric grafts extending substantially perpendicular to the backbone, wherein the functional groups in the polymeric grafts contain metal-binding groups.

In the conventional art, polymer fiber adsorbents are typically prepared via radiation-induced graft polymerization (RIGP) because RIGP maintains strong yet ductile properties of trunk polymers, such as polyethylene, and adds specific chelate-forming graft chains containing functional groups for the recovery of metals. However, RIGP also has many limitations, including the high cost of operation when an electron-beam irradiation is used, a limited choice of monomers tolerable to irradiation, the lack of control over polymer structures (e.g., graft chain composition, composition distribution, and degree of grafting), and in some cases, the formation of homopolymers. The lack of control in the grafting process often results in fibers with degraded adsorption or selectivity performance. Thus, there would be a significant benefit in a process that could produce metal-binding fibers with greater adsorption or selectivity performance. There would be a further benefit in such a process that is less costly and which may also be more amenable to control and fine tuning of the metal-binding characteristics of the fiber.

SUMMARY OF THE INVENTION

In one aspect, the invention is directed to a functionalized fiber useful in the absorption of metal ions from aqueous solutions, produced according to the method described hereinbelow. The fiber includes a polyolefin backbone having a diameter of at least 1 micron and having covalently appended on its surface halogen atoms and vinyl-addition (e.g., polyvinyl) polymeric grafts functionalized with metal-binding groups. The metal-binding groups in the polymeric grafts can be, for example, at least one functional group selected from carboxylate, keto, aldo, amino, imino, nitrile, amido, oxime, amidoxime, imide dioxime, and hydroxamate groups. In some embodiments, the vinyl-addition polymeric grafts are further functionalized with hydrophilic groups different from the metal-binding groups. The hydrophilic groups may be selected from, for example, carboxylate, sulfone, sulfonate, phosphonate, alkylammonium, iminium, amide, pyrrolidone, and polyalkyleneglycol groups.

In particular embodiments, the vinyl-addition polymeric grafts have the general formula:

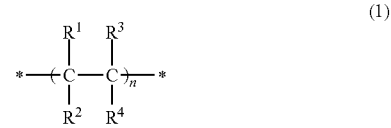

In Formula (1) above, $R^1$, $R^2$, $R^3$, and $R^4$ are independently selected from hydrogen atom, hydrocarbon groups having at least 1 and up to 12 carbon atoms, metal-binding groups containing at least one heteroatom selected from nitrogen, oxygen, sulfur, and phosphorus, and/or hydrophilic groups, with at least one of $R^1$, $R^2$, $R^3$, and $R^4$ being a metal-binding group; and the subscript n is generally an integer of at least 10, 15, or 20. The two asterisks in the formula represent connection points, with one of the connection points being a covalent bond to the surface of the fiber (i.e., to the polyolefin backbone of the fiber). By necessity, the other connection point (asterisk) in Formula (1) is a covalent bond to a terminating (capping) group, which may be any of the groups provided for groups $R^1$, $R^2$, $R^3$, and $R^4$.

In another aspect, the invention is directed to a method for fabricating the above-described metal-binding fiber. In the method, a halogenated polyolefin precursor fiber (i.e., "precursor fiber") having a diameter of at least 1 micron is reacted with vinyl-functionalized monomers in solution under conditions conducive to surface-initiated atom-transfer radical polymerization (ATRP), wherein the vinyl-functionalized monomers are functionalized with metal-binding groups or precursors to metal-binding groups. ATRP polymerization of the vinyl-functionalized monomers results in polymeric grafts covalently bonded to and extending radially or substantially perpendicular from the surface of the precursor fiber. The conditions for the ATRP process include at least contacting the precursor fiber with the vinyl-functionalized monomers in solution in the presence of an ATRP catalyst, wherein, during the ATRP reaction, at least a portion (i.e., a portion or all) of the halogen atoms on the precursor fiber are converted to radical initiation sites that initiate a radical-based vinyl addition reaction with the vinyl-functionalized monomers to form vinyl-addition polymeric grafts covalently attached to the precursor fiber. The end result of the ATRP process is a metal-binding fiber, as described above, having a polyolefin backbone (trunk) with metal-binding polymeric grafts covalently bound to and extending radially or substantially perpendicular from the surface of the polyolefin backbone.

In another aspect, the invention is directed to a method for extracting metal ions from a liquid (e.g., aqueous) solution containing metal ions by contacting the liquid solution with the functionalized fibers described above. The metal ions being extracted can be any desired metal ions, but are more typically selected from transition, lanthanide, and actinide metals.

By virtue of the instant methodology, polyolefin fibers can be facilely and efficiently functionalized with any of a variety of functional groups useful for binding to and extracting metals from solutions. The method is further advantageous in that it is generally lower in cost and more straightforward than other conventional grafting processes, such as RIGP, which makes the process more amenable for large scale commercial production. The method also advantageously provides for a high level of control over the final polymer architecture, including the graft chain composition, composition distribution, and the degree of grafting, all of which have a significant impact on the metal-binding efficiency and selectivity of the metal-binding fibers.

The metal-binding fibers provide a particular advantage in extracting uranium from seawater. Increasing energy demands and uncertainty in fossil fuel-based energy sources are the main driving forces behind a resurgence of nuclear power among other alternative energy forms. The supply of uranium from terrestrial ores is limited and access can be further hindered through geopolitical activities. Alternative uranium reserves exist in the oceans, albeit in low concentrations (3.3 ppb) as the tricarbonato anion $[UO_2(CO_3)_3]^{4-}$ ((a) Davies, R. V., et al., *Nature*, 1964, 203 (495), 1110; and (b) Saito, K., et al., *Kagaku Kogaku Ronbunshu*, 1981, 7 (6), 545-548). The approximate 1.3 billion $km^3$ of water in the oceans contains a myriad of elements. Although many of the elements are in low concentrations (e.g., transition metals, lanthanides, and uranium), when combined with the vast quantity of seawater the low concentrations result in large untapped reserves. In view of rising energy demands, uranium reserves, such as seawater, nuclear fuel effluents, mine tailings, and others, have become alternative resources of interest (Rao, T. P., et al., *Talanta*, 2006, 68 (4), 1047-1064). Extracting uranium from seawater is challenging due to its low concentration and the large number of competing ions. However, the metal-binding fibers described herein provide a distinct advantage in overcoming this challenge by virtue of their capability in preferentially extracting uranium even in the presence of numerous other metal species.

The present invention demonstrates that ligand density, hydrophilicity, and high degree of grafting (d.g.) are crucial for improved performance for uranium recovery from seawater. A fibrous adsorbent with selected ligand density/hydrophilicity ratio and a high d.g. exhibited fast uranium adsorption (salinity-normalized adsorption capacity: 5.292 mg U/g at 24.9-day exposure) and high uranium adsorption capacity in seawater. The usage of halogenated trunk polymers in controlled radical polymerization resulted in the grafting of functional polymers with controlled structures (e.g., varied graft chain lengths, block copolymers). Significantly, an expensive, uncontrolled RIGP is no longer needed, leading to the possibility of lower production cost. Fibrous adsorbents in this invention were typically grafted round fibers, without any porous structure (i.e., no additional surface area). The results presented in this application demonstrate fast and efficient uranium adsorption using adsorbents that do not possess the high surface areas of adsorbents of the conventional art. Moreover, the cost of these round fibers is generally substantially lower than the porous trunk fibers of the art.

DETAILED DESCRIPTION OF THE INVENTION

Figure 1:
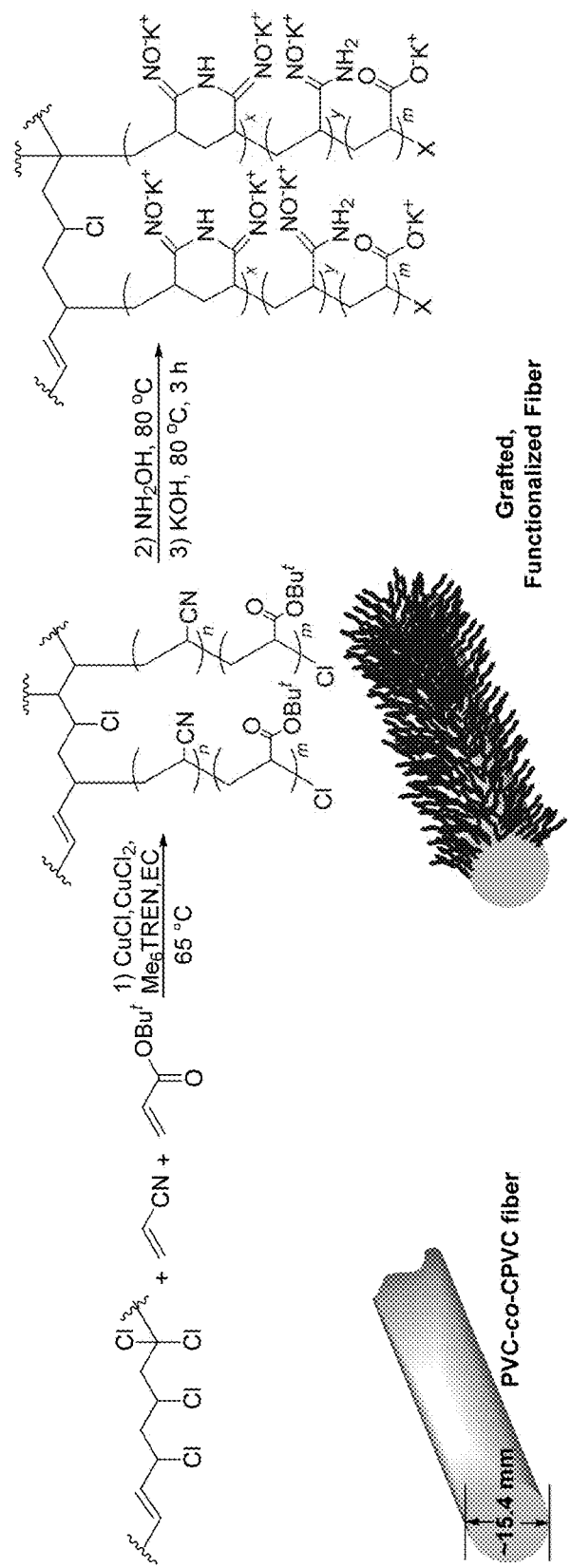
FIG. 1. Schematic showing a process for preparing fibrous metal-binding adsorbents from a representative halogen-containing fiber substrate (PVC-co-CPVC), wherein a first step is an ATRP process for attaching to the fiber polymeric grafts containing nitrile and carboxy ester groups, a second step is conversion of the nitrile groups to amidoxime groups, and a third step is conversion of the carboxy ester groups to carboxylate salt groups by base hydrolysis. The top portion of FIG. 1 shows the chemical details of the process, while the bottom portion of FIG. 1 is a pictorial rendition of the starting halogenated (precursor) fiber (left) and resulting grafted fiber (right).

In one aspect, the invention is directed to metal-binding fibers containing a polyolefin backbone and vinyl-addition (polyvinyl) polymeric grafts covalently attached to the surface of the polyolefin backbone. The vinyl-addition polymeric grafts extend radially or substantially perpendicular from the surface of the polyolefin backbone. The term "fiber," as used herein, refers to a structure having a length dimension at least 10, 20, 50, or 100 times longer than the other two dimensions. Thus, the polyolefin backbone, which defines the shape of the fiber, has a length dimension at least ten times longer than the other two dimensions, wherein the other two dimensions are generally substantially or completely equivalent and correspond to the diameter of the fiber.

Generally, the polyolefin backbone (and hence, the metal-binding fiber) has a diameter of at least or above 1 micron. In some embodiments, the polyolefin backbone has a diameter of at least, above, up to, or less than 2, 3, 4, 5, 10, 20, 50, 100, 200, 300, 400, 500, or 1000 microns, or a diameter within a range bounded by any two of the above values. The fiber may have any possible shape, such as a cylindrical (i.e., circular) shape or polygonal shape. As the polyolefin backbone provides the size and shape of the fiber, the above dimensions and shapes also correspond to the polyolefin backbone. The fiber may also be solid across its diameter or it may be hollow.

The polyolefin backbone can have a composition and shape corresponding to any of the polyolefin fibers well known in the art. The polyolefin backbone may correspond to, for example, polyethylene, polypropylene, or polybutylene, or a copolymer thereof. In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra high molecular weight polyethylene (UHMWPE). In the case of polypropylene, the polypropylene can also be any of the types of polypropylenes known in the art, e.g., isotactic, atactic, and syndiotactic polypropylene. The polyolefin backbone may also be derived from, or include segments or monomeric units of other addition monomers, such as styrene, acrylic acid, methacrylic acid, acrylate salt, methacrylate salt, acrylate ester, methacrylate ester, vinyl acetate (as well as partially or fully hydrolyzed derivatives of vinyl acetate, such as vinyl alcohol), terephthalate (e.g., as polyethylene terephthalate, or PET), acrylonitrile, and halogenated olefins (e.g., fluorinated, chlorinated, or brominated olefins), as found in, for example, polystyrene, polyacrylic acid, polyacrylonitrile, polyvinylfluoride, polyvinylidene fluoride, and polytetrafluoroethylene.

The surface of the polyolefin backbone (i.e., fiber surface) is covalently appended to vinyl-addition (i.e., polyvinyl) polymeric grafts extending radially outward or substantially perpendicular to the surface of the polyolefin backbone, in analogous fashion to a brush polymer. The vinyl-addition polymeric grafts are polymeric units derived from vinyl-addition polymerization of vinylic monomer units, as further described below. The vinyl-addition polymeric grafts typically contain saturated carbon-carbon bonds in the graft polymer backbone; however, the vinyl-addition polymeric grafts may, in some instances, include carbon-carbon double bonds in the graft polymeric backbone, as in polybutadiene. In one set of embodiments, the polymeric grafts are homopolymeric, which results from the use of a single type of vinylic monomer during the atom-transfer radical polymerization (ATRP) reaction, as further discussed below. In another set of embodiments, the polymeric grafts are copolymeric, such as block, random, or alternating copolymeric, which results from the use of two or more types of vinylic monomers during the ATRP reaction.

The vinyl-addition polymeric grafts include metal-binding groups (i.e., "ligand groups") in substituents attached to the graft polymer backbone. The metal-binding groups are generally heteroatom-containing functional groups containing at least one, two, three, or four heteroatoms selected from nitrogen, oxygen, sulfur, and phosphorus. The metal-binding groups may be bound directly to the graft polymer backbone or indirectly by a linker, such as a methylene (—$CH_2$—), polymethylene (—$CH_2$—)$_n$, oxygen-containing, or amine-containing linker, where n may be 2-10. The metal-binding groups can bind to a metal by any of the metal-ligand binding interactions known in the art. The metal-ligand interaction may be, for example, a coordinate (dative), ionic, or hydrogen bond, or a combination thereof. In some embodiments, the metal-binding group may have the ability to chelate to a metal ion. As known in the art, the term "chelate" refers to the ability of a ligand to bind to a metal species via at least two, three, four, or more separate metal-ligand bonds. A ligand (metal-binding group) that can chelate a metal is also known as a polydentate ligand. The ability or inability for a ligand to chelate a metal species is particularly dependent on the type of metal species.

In some embodiments, at least one of the metal-binding (i.e., heteroatom-containing) functional groups is a carboxylate group, wherein the term "carboxylate" is intended to include carboxylic acid groups (i.e., —COOH), carboxylate esters (i.e., —COOR, wherein R is a hydrocarbon group), and carboxylate salts (i.e., —COO$^-$M$^+$, wherein M$^+$ is a cationic species, such as a metal or ammonium cation. In other embodiments, at least one of the metal-binding functional groups is a hydroxy (OH) group. In other embodiments, one or more of the metal-binding functional groups is selected from a nitrogen-containing group, such as a nitrile (CN), amino (e.g., —$NH_2$, —NHR, —$NR_2$, —$NR_3^+$, —$CH_2CH_2NH_2$, —$CH_2CH_2NHR$, —$CH_2CH_2NR_2$, or —$NRCH_2CH_2NH_2$), amido (e.g., —C(O)$NH_2$, —$CH_2$C(O)$NH_2$, —$CH_2CH_2$C(O)$NH_2$, —C(O)NHR, —C(O)$NR_2$, —C(O)$NR_3^+$), imino (e.g., —CH=NH, —$CH_2$CH=NH, —CR=NH, —CH=NR, or —CR=NR), oxime (e.g., —CH=N—OH, —$CH_2$CH=N—OH or —CR=N—OH), amidoxime (e.g., —C($NH_2$)=N—OH, —C(NHR)=N—OH, or —C($NR_2$)=N—OH), imide dioxime (e.g., —NH—(CR=N—OH)$_2$, wherein the two R groups may interconnect), and/or hydroxamate group (e.g., —C(O)—NR—OH, —C(O)—NH—OH, —$CH_2$C(O)—NR—OH, or —$CH_2$C(O)—NH—OH). The metal-binding group may also be a keto (e.g., —C(O)$CH_3$ or —$CH_2$C(O)$CH_3$) or aldo (e.g., —C(O)H or —$CH_2$C(O)H) group. In some embodiments, the metal-binding group is incorporated into the polymeric graft by being included in the vinylic monomer from which the polymeric graft is derived. In other embodiments, the metal-binding group may be incorporated into the polymeric graft by conversion of a first heteroatom-containing group (which may be an initial metal-binding group), that may have originated from the vinylic monomer, to a metal-binding group (or different metal-binding group) by suitable chemical or physical conversion of the original heteroatom-containing group. One example of such a conversion reaction is the conversion of aldehyde or ketone groups, as may have been incorporated in the polymeric graft by graft polymerization of acrolein or derivative thereof, to oxime groups. Another example of such a conversion reaction is the conversion of nitrile groups, as may have been incorporated in the polymeric graft by graft polymerization of acrylonitrile monomers, to amidoxime groups by reaction of the nitrile groups with hydroxylamine.

In addition to the metal-binding groups, as discussed above, the vinyl-addition polymeric grafts may or may not also be functionalized with hydrophilic groups, which may or may not also be a metal-binding group or may or may not be any of the specific metal-binding groups provided above. As well known, a hydrophilic group is a neutral or charged species that is substantially polar by virtue of the presence of one or more heteroatoms, such as oxygen, nitrogen, sulfur, and/or phosphorus. Whether the hydrophilic group is a metal-binding group or not, the hydrophilic group is different than the one or more metal-binding groups selected to be present in the vinyl-addition polymeric grafts. In one set of embodiments, the one or more types of hydrophilic groups in the vinyl-addition polymeric grafts may be selected from any of the metal-binding groups provided above, except that the hydrophilic group is different from other metal-binding groups in the vinyl-addition polymeric grafts. In another set of embodiments, the one or more types of hydrophilic groups in the vinyl-addition polymeric grafts are not any of the metal-binding groups provided above, or are not metal-binding groups altogether. Some particular examples of hydrophilic groups include carboxylate, alkoxy (—OR', wherein R' is a hydrocarbon group having up to three carbon atoms), sulfone, sulfonate, phosphonate, alkylammonium, iminium, amide, pyrrolidone, and polyalkyleneglycol groups. Some examples of particular hydrophilic polymer segments in the vinyl-addition polymeric grafts include poly(tert-butyl acrylate), poly(dialkyl itaconate), poly(N-vinylformamide), poly(alkyl acrylate), poly(alkyl methacrylate), poly(dialkylvinyl phosphonate), poly(sodium 4-vinylbenzenesulfonate), and their hydrolysis products.

If hydrophilic groups are present, the metal-binding and hydrophilic groups are typically present in a metal-binding:hydrophilic group molar ratio of, for example, 2:1, 1.5:1, 1:1, 1:1.5, or 1:2, or within a range of molar ratios bounded by any two of the foregoing ratios, such as a molar range of 2:1 to 1:2, or 1:1 to 1:2, or 2:1 to 1:1, or 1.5:1 to 1:1.5, or 1.5:1 to 1:1, or 1:1 to 1:1.5. The vinyl-addition polymeric grafts may or may not also contain hydrocarbon group substituents (e.g., methyl, ethyl, propyl, or butyl groups) and/or halogen atoms, such as F, Cl, Br, and/or I.

In particular embodiments, the vinyl-addition polymeric grafts have the formula:

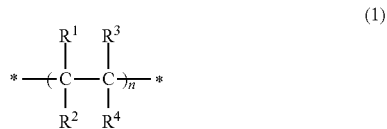

$$*-[\underset{R^2}{\overset{R^1}{C}}-\underset{R^4}{\overset{R^3}{C}}]_n-* \quad (1)$$

In Formula (1), the two asterisks represent connection points, with one of the connection points being a covalent bond between the fiber and vinyl-addition polymeric graft according to Formula (1) and the other connection point being a bond between the vinyl-addition polymeric graft according to Formula (1) and a terminating group. The subscript n in Formula (1) is generally an integer of at least 10. In different embodiments, n can be an integer of at least, above, up to, or less than, for example, 10, 15, 20, 25, 30, 35, 40, 45, 50, 100, 150, 200, 250, 300, 400, 500, 1000, 5000, or 10,000, or an integer within a range bounded by any two of the foregoing values. The —C—C— moiety shown in Formula (1) corresponds to the graft polymer backbone, which is analogous to but distinct from the polyolefin backbone of the fiber. Each —C($R^1R^2$)—C($R^3R^4$)— moiety in Formula (1) corresponds to a vinylic unit.

The substituents $R^1$, $R^2$, $R^3$, and $R^4$ in Formula (1) are independently selected from hydrogen atom, hydrocarbon groups having at least 1 and up to 12 carbon atoms, halogen atoms, and any of the heteroatom-containing functional groups described above that may be a metal-binding or hydrophilic group, provided that at least one of $R^1$, $R^2$, $R^3$, and $R^4$ is a metal-binding group in each or a portion of the vinylic units in the vinyl-addition polymeric graft according to Formula (1). In some embodiments, at least one of $R^1$, $R^2$, $R^3$, and $R^4$ is also a hydrophilic group in each or a portion of the vinylic units in the vinyl-addition polymeric graft according to Formula (1). In some embodiments, the groups $R^1$, $R^2$, $R^3$, and $R^4$ are the same over all polymeric units n. In other embodiments, one or more of the groups $R^1$, $R^2$, $R^3$, and $R^4$ may be different over polymeric units n, in which case the vinyl-addition polymeric graft is copolymeric, such as a block, alternating, or random copolymer. Moreover, Formula (1) can represent a portion (e.g., a block of a copolymer) or the entire vinyl-addition polymeric graft. By necessity, the composition of Formula (1) has a terminating (capping) group, which may be any of the groups provided above for groups $R^1$, $R^2$, $R^3$, and $R^4$.

In some embodiments, two of $R^1$, $R^2$, $R^3$, and $R^4$ (e.g., $R^2$ and $R^4$) can be crosslinked, either within a polymeric unit n (as in polybutyral or polycyclopentene) or between polymeric units to form a cyclic group. In other embodiments, the vinyl-addition polymeric graft shown in Formula (1) can include a level of unsaturation by including a carbon-carbon double bond between the shown carbon atoms in the backbone (in which case two of $R^1$, $R^2$, $R^3$, and $R^4$ are removed from the formula to form a double bond) or by including a carbon-carbon double bond between carbon atoms of adjacent units (in which case one of $R^1$, $R^2$, $R^3$, and $R^4$ from one unit and one of $R^1$, $R^2$, $R^3$, and $R^4$ from another unit are removed from the formula to form a double bond between adjacent units).

The surface of the polyolefin backbone (i.e., surface of the fiber) is generally also covalently appended to halogen atoms (typically, Cl or Br atoms), at least some of which are left over from a halogenated precursor polymer fiber as unreacted halogen sites during the ATRP process, as further discussed below. When the surface of the polyolefin backbone is appended to halogen atoms, the polyolefin backbone may alternatively be referred to as a "halogenated polyolefin backbone". Since at least a portion of the halogen atoms served as active sites for attachment of polymeric grafts during the ATRP reaction, at least some of the halogen atoms should be halogen atoms that were amenable to reaction in the ATRP process. Some examples of such halogen atoms include chlorine, bromine, and iodine atoms.

The term "hydrocarbon group" (identified as "R"), as used above, designates, in a first embodiment, groups composed solely of carbon and hydrogen and containing at least one carbon-hydrogen bond. In different embodiments, one or more of the hydrocarbon groups can independently contain, for example, one, two, three, four, five, six, seven, eight, nine, ten, eleven, or twelve carbon atoms, or a number of carbon atoms within a particular range bounded by any two of the foregoing carbon numbers.

The hydrocarbon groups (R) can be, for example, saturated and straight-chained (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, and n-dodecyl groups.

The hydrocarbon groups (R) can alternatively be saturated and branched (i.e., branched alkyl groups). Some examples of branched alkyl groups include isopropyl (2-propyl), isobutyl (2-methylprop-1-yl), sec-butyl (2-butyl), t-butyl, 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, and isohexyl (4-methylpent-1-yl), wherein the "1-yl" suffix represents the point of attachment of the group.

The hydrocarbon groups (R) can alternatively be saturated and cyclic (i.e., cycloalkyl groups). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

The hydrocarbon groups (R) can alternatively be unsaturated and straight-chained (i.e., straight-chained olefinic or alkenyl groups). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl (CH$_2$=CH—CH$_2$—CH$_2$—), 2-buten-1-yl (CH$_2$—CH=CH—CH$_2$—), butadienyl, and 4-penten-1-yl groups.

The hydrocarbon groups (R) can alternatively be unsaturated and branched (i.e., branched olefinic or alkenyl groups). Some examples of branched olefinic groups include propen-2-yl, 3-buten-2-yl (CH$_2$=CH—CH.—CH$_3$), 3-buten-3-yl (CH$_2$=C.—CH$_2$—CH$_3$), 4-penten-2-yl, 4-penten-3-yl, 3-penten-2-yl, 3-penten-3-yl, and 2,4-pentadien-3-yl. The dot in the foregoing exemplary formulas represents a radical or the point of attachment of the group.

The hydrocarbon groups (R) can alternatively be unsaturated and cyclic (i.e., cycloalkenyl groups). The unsaturated and cyclic group can be aromatic or aliphatic. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene.

One or more of the hydrocarbon groups (or linkers) may also include one or more heteroatoms (i.e., non-carbon and non-hydrogen atoms), such as one or more heteroatoms selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylic ester, amide, and urea functionalities), nitro (NO$_2$), carbon-oxygen-carbon (ether), sulfonyl, and sulfinyl (i.e., sulfoxide) groups. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., —NR$_2$ or NR$_3^+$, wherein R is independently selected from H and hydrocarbon groups set forth above), nitrile, amide (i.e., —C(O)NR$_2$ or —NRC(O)R, wherein R is independently selected from hydrogen atom and hydrocarbon groups set forth above), imine (e.g., —CR=NR, wherein R is independently H or a hydrocarbon group), oxime (—CR=N—OH), amidoxime (—C(NH$_2$)=N—OH), nitro, urea (—NR—C(O)—NR$_2$, wherein R is independently H or a hydrocarbon group), and carbamate groups (—NR—C(O)—OR, wherein R is independently H or a hydrocarbon group). Some examples of phosphorus-containing groups include —PR$_2$, —PR$_3^+$, —P(=O)R$_2$, —P(OR)$_2$, —O—P(OR)$_2$, —R—P(OR)$_2$, —P(=O)(OR)$_2$, —O—P(=O)(OR)$_2$, —O—P(=O)(OR)(R), —O—P(=O)R$_2$, —R—P(=O)(OR)$_2$, —R—P(=O)(OR)(R), and —R—P(=O)R$_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—SO$_2$R), sulfonate (—S(=O)$_2$OR, wherein R is H, a hydrocarbon group, or a cationic group), and sulfate groups (—OS(=O)$_2$OR, wherein R is H, a hydrocarbon group, or a cationic group). Some examples of halide atoms include fluorine, chlorine, bromine, and iodine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker.

In embodiments where the hydrocarbon group (R) is or includes a cyclic group, the cyclic group may be monocyclic by containing a single ring without connection or fusion to another ring. The cyclic hydrocarbon group may alternatively be, for example, bicyclic, tricyclic, tetracyclic, or a higher polycyclic ring system by having at least two rings interconnected (i.e., by a bond) and/or fused.

In some embodiments, the cyclic hydrocarbon group is carbocyclic, i.e., does not contain ring heteroatoms (i.e., only ring carbon atoms). In different embodiments, ring carbon atoms in the carbocyclic group are all saturated, or a portion of the ring carbon atoms are unsaturated, or the ring carbon atoms are all unsaturated, as found in aromatic carbocyclic groups, which may be monocyclic, bicyclic, tricylic, or higher polycyclic aromatic groups.

In some embodiments, the hydrocarbon group (R) is or includes a cyclic or polycyclic group that includes at least one ring heteroatom (for example, one, two, three, four, or higher number of heteroatoms). Such ring heteroatom-substituted cyclic groups are referred to herein as "heterocyclic groups". As used herein, a "ring heteroatom" is an atom other than carbon and hydrogen (typically, selected from nitrogen, oxygen, and sulfur) that is inserted into, or replaces a ring carbon atom in a hydrocarbon ring structure. In some embodiments, the heterocyclic group is saturated, while in other embodiments, the heterocyclic group is unsaturated (i.e., aliphatic or aromatic heterocyclic groups, wherein the aromatic heterocyclic group is also referred to herein as a "heteroaromatic ring" or a "heteroaromatic fused-ring system" in the case of at least two fused rings, at least one of which contains at least one ring heteroatom). In some embodiments, the heterocyclic group is bound via one of its ring carbon atoms to another group (i.e., other than hydrogen atom and adjacent ring atoms), while the one or more ring heteroatoms are not bound to another group. In other embodiments, the heterocyclic group is bound via one of its heteroatoms to another group, while ring carbon atoms may or may not be bound to another group.

In another aspect, the invention is directed to a method for fabricating the metal-binding fiber described above. In the method, a halogen-containing polyolefin precursor fiber (i.e., "halogenated precursor fiber") having any of the fiber shapes and dimensions discussed above for the metal-binding fiber is reacted in solution with one or more vinylic monomers containing one or more metal-binding or metal-binding precursor groups (and optionally, hydrophilic groups) under conditions conducive to surface-initiated atom-transfer radical polymerization (ATRP). In some embodiments, the ATRP process is used in the absence of a radiation-induced graft polymerization (RIGP) process. In some embodiments, the ATRP process is used in the absence of a sonochemical grafting process.

The conditions conducive to ATRP include contacting the halogen-containing precursor fiber with the vinyl-functionalized monomers in solution in the presence of an ATRP catalyst. The ATRP catalyst can be any of the ATRP catalysts known in the art, typically a transition metal complex, such as a copper-containing catalyst (e.g., CuCl and/or CuCl$_2$) in the presence of a polydentate amino-containing ligand, such as tris(2-(dimethylamino)ethyl)amine ($Me_6$-TREN). The conditions conducive to ATRP may further include maintaining the reaction solution at an elevated temperature, such as a temperature of at least or above, for example, 30° C., 35° C., 40° C., 45° C., 50° C., 55° C., 60° C., 65° C., 70° C., 75° C., 80° C., 85° C., 90° C., 95° C., or 100° C., or a temperature within a range bounded by any two of these temperatures. The conditions and general methodology useful in conducting an ATRP process are all well known in the art, as evidenced by, for example, T. Saito et al., *J. Mater. Chem. A*, 2, pp. 14674-14681, 2014, the contents of which are herein incorporated by reference in their entirety.

The halogen-containing precursor fiber can be made of any of the solid halogen-containing polymer compositions known in the art. Some examples of chlorine-containing polymers include polyvinyl chloride (PVC), chlorinated polyvinyl chloride (CPVC), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, polyvinyl chloride acetate, further halogenated (e.g., chlorinated) forms thereof, and copolymers thereof (e.g., PVC-co-CPVC). Some examples of brominated polymers include poly(vinyl bromide), brominated epoxy, poly(brominated acrylate), brominated polycarbonate, brominated polyols, brominated polyethylene, and brominated polypropylene. Since, as further discussed below, the halogen-containing precursor fiber may be produced by halogenation of a polyolefin (e.g., polyethylene or polypropylene) fiber, or further halogenation of an already halogen-containing fiber, the halogen-containing precursor fiber resulting from the halogenation process typically has a composition where halogen atoms are non-uniformly or randomly distributed on its surface, thereby not corresponding to any of the halogen-containing polymers prepared by polymerization of halogen-containing olefinic monomers.

During the ATRP reaction, at least a portion of the halogen atoms on the halogen-containing precursor fiber are converted to radical initiation sites that initiate a radical-based vinyl-addition reaction with the vinylic monomers to result in grafting and polymerization chain growth of the vinylic monomers to ultimately form the vinyl-addition polymeric grafts covalently attached to the polyolefin backbone of the halogen-containing precursor fiber. At least a portion of the vinylic monomers are functionalized with metal-binding groups or precursor groups that can be converted to metal-binding groups, in order for the resulting vinyl-addition polymeric grafts to be functionalized with metal-binding groups or precursor groups that can be converted to metal-binding groups.

The vinylic monomer is any molecule containing at least one carbon-carbon double bond and that can graft onto a halogen-containing precursor fiber and undergo vinyl-addition polymerization under the conditions of the ATRP process to form a vinyl-addition polymeric graft, such as according to Formula (1). In some embodiments, only a single vinylic monomer is used, in which case the resulting vinyl-addition polymeric graft is a homopolymer. In the case of a homopolymeric graft, each vinylic monomer from which the graft is derived includes at least a metal-binding group or precursor to a metal-binding group, which results in a metal-binding group or precursor to a metal-binding group in each vinylic unit of the vinyl-addition polymeric graft according to Formula (1). The homopolymeric graft may or may not further include a hydrophilic group, which may be introduced into the graft by using a vinylic monomer that contains both a metal-binding group and a hydrophilic group. In other embodiments, two or more vinylic monomers are used, in which case the resulting vinyl-addition polymeric graft is a copolymer. In the case of a copolymeric graft, at least one of the vinylic monomers from which the graft is derived includes a metal-binding group or a precursor to a metal-binding group, while the at least one other vinylic monomer may contain another metal-binding group or a precursor to a metal-binding group, or a hydrophilic group, or a halogen-containing group, or a hydrocarbon group. In some embodiments, at least one (i.e., one, two, three, or more) of the vinylic monomers are selected from acrylonitrile, acrylate (salt), acrylic acid, acrylic acid ester (e.g., alkyl acrylates), methacrylate (salt), methacrylic acid, methacrylic acid ester (e.g., alkyl methacrylates), itaconic acid, isoprene, vinylchloride, vinylidene chloride, vinylfluoride, vinylidene fluoride, vinylacetate, acrylamide, styrene, sodium styrenesulfonate, cyano styrene, cyanoacrylate, acrolein, 4-hydroxybutyl acrylate, 2-hydroxyethyl acrylate, vinylalcohol, vinylamine, 2-vinylpyridine, 4-vinylpyridine, 1-vinylimidazole, 2-methyl-1-vinylimidazole, vinylpyrrolidone, 2-vinylpyrrole, 3-vinylpyrrole, 2-vinylaniline, 4-vinylaniline, 2-vinylthiophene, 3-vinylthiophene, vinylacetate, 4-vinylphenol, acryloyl diphosphoric acid, diphenyl (4-vinylphenyl)phosphine, vinyl phosphonic acid, diethyl vinyl phosphite, vinyl sodium sulfonate, 1-amino-3-butene, 1-amino-4-pentene, 1-hydroxy-3-butene, 1-hydroxy-4-pentene, methyl vinyl ether, divinyl ether, cyclic vinyl monomers (e.g., cyclopentene or norbornene), methacryloxypropyltriethoxysilane, provided that at least one of the vinylic monomers includes a metal-binding group or precursor to a metal-binding group.

In some embodiments, the vinylic monomers contain nitrile, aldehyde, or ketone groups as metal-binding groups or precursors to metal-binding groups. After incorporation into the vinyl-addition polymeric grafts by ATRP polymerization, the nitrile, aldehyde, or ketone groups are converted to amidoxime, imide dioxime, oxime, and/or hydroxamate groups by reaction with hydroxylamine. In further embodiments, vinylic monomers containing nitrile, aldehyde, or ketone groups as metal-binding groups or precursors to metal-binding groups are admixed with vinylic monomers functionalized with hydrophilic groups, such as selected from carboxylate, hydroxy, sulfone, sulfonate, phosphonate, alkylammonium, iminium, amide, pyrrolidone, and polyalkyleneglycol groups. After incorporation into the vinyl-addition polymeric grafts by ATRP polymerization, the nitrile, aldehyde, or ketone groups are converted to amidoxime, imide dioxime, oxime, and/or hydroxamate groups by reaction with hydroxylamine, with the result that amidoxime, imide dioxime, oxime, and/or hydroxamate groups are present in the vinyl-addition polymeric grafts along with the hydrophilic groups. In some embodiments, the vinylic monomer may include a precursor to a hydrophilic group, such as an acrylate or methacrylate ester (e.g., ethyl acrylate, ethyl methacrylate, n-propyl acrylate, isopropyl acrylate, n-butyl acrylate, tent-butyl acrylate, or neopentyl acrylate), which, after incorporation into the vinyl-addition polymeric graft, can be converted to an acrylate or methacrylate salt by ester hydrolysis with a suitable base, such as potassium hydroxide.

In particular embodiments, the vinylic monomer has the general formula:

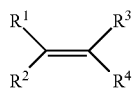

(2)

In Formula (2), $R^1$, $R^2$, $R^3$, and $R^4$ are as described above, i.e., independently selected from hydrogen atom, hydrocarbon groups having at least 1 and up to 12 carbon atoms, halogen atoms, and any of the heteroatom-containing functional groups described above that may be a metal-binding group, precursor to a metal-binding group, or hydrophilic group. In order for the vinyl-addition polymeric graft to include metal-binding groups or precursors to metal-binding groups, at least one of the vinylic monomers according to Formula (2) includes at least one $R^1$, $R^2$, $R^3$, or $R^4$ group as a metal-binding group or precursor to a metal-binding group. In some embodiments, at least one of the vinylic monomers includes at least one $R^1$, $R^2$, $R^3$, and $R^4$ as a hydrophilic group.

In a first set of particular embodiments for Formula (2), at least one of $R^1$, $R^2$, $R^3$, and $R^4$ is or includes a nitrile group, an amino group, aldehyde (aldo) group, or keto group. In a second set of particular embodiments, at least one of $R^1$, $R^2$, $R^3$, and $R^4$ is or includes a heteroatom-containing functional group that can bind to metal ions and/or function as a hydrophilic group, in addition to any of the foregoing groups. The at least one heteroatom-containing functional group may be, for example, a carboxylate, keto, aldo, amino, imino, amido, oxime, or amidoxime group. In a third set of particular embodiments, at least one of $R^1$, $R^2$, $R^3$, and $R^4$ is or includes a negatively-charged group, such as a sulfonate or carboxylate group. In a fourth set of particular embodiments, at least one of $R^1$, $R^2$, $R^3$, and $R^4$ is or includes a halogen atom. In a fifth set of particular embodiments, at least one of $R^1$, $R^2$, $R^3$, and $R^4$ is or includes a heteroatom-substituted or -unsubstituted hydrocarbon group (R) having at least one carbon atom.

If vinylic monomers containing hydrophilic groups are present along with vinylic monomers containing metal-binding groups or precursors to metal-binding groups, the metal-binding and hydrophilic groups are typically present in a metal-binding:hydrophilic group molar ratio of, for example, 2:1, 1.5:1, 1:1, 1:1.5, or 1:2, or within a range of molar ratios bounded by any two of the foregoing ratios, such as a molar range of 2:1 to 1:2, or 1:1 to 1:2, or 2:1 to 1:1, or 1.5:1 to 1:1.5, or 1.5:1 to 1:1, or 1:1 to 1:1.5. In some embodiments, a nitrile-containing vinylic monomer (e.g., acrylonitrile) is used in combination with a hydrophilic group-containing vinylic monomer, such as a carboxylate-containing vinylic monomer (e.g., an acrylate or methacrylate ester), in any of the molar ratios provided above, particularly in a nitrile to hydrophilic group (e.g., carboxylate) molar ratio of 1.5:1 to 1:2 or 1:1 to 1:2.

To produce a solution containing the components to be reacted in the ATRP process, the components are completely or substantially dissolved in a suitable solvent. In some embodiments, the solvent is aqueous (i.e., may be or include water), while in other embodiments the solvent is non-aqueous. In some embodiments, a single solvent is used, whereas in other embodiments, a mixture of two or more solvents is used, generally in a single phase. In a first embodiment, the solvent is a polar protic liquid that is non-reactive with the other components of the ATRP reaction. Some examples of polar protic liquids include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). In a second embodiment, the solvent is a polar aprotic liquid that is non-reactive with the other components of the ATRP reaction. Some examples of polar aprotic liquids include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,1-trichloroethane, 1,2-dichlorobenzene), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), hexamethylphosphoramide (HMPA), N-methylpyrrolidone (NMP), 1,3-dimethyl-3,4,5,6-tetrahydro-2(1H)-pyrimidinone (DMPU), propylene glycol methyl ether acetate (PGMEA), and supercritical carbon dioxide. In a third embodiment, the solvent is a non-polar liquid. Some examples of non-polar liquids include the liquid hydrocarbons, such as a pentane (e.g., n-pentane or isopentane), hexane, heptane, octane, pentene, hexene, heptene, octene, benzene, toluene, and xylene.

The above-described ATRP grafting and polymerization process can typically achieve a degree of grafting (i.e., grafting yield) of at least 25%. In different embodiments, the grafting yield is at least 30%, 40%, 50%, 60%, 75%, 100%, 120, 150, 200, 300, 400, 500, 600, 700, 800, 900, 1000, 1200, 1500, 1800, 2000, 2200, 2500, 2800, 3000, 3500, or 4000%.

The method for producing a metal-binding fiber may also include producing the halogen-containing precursor fiber that functions as a substrate in the ATRP reaction. In one embodiment, the halogen-containing precursor fiber is produced by vinyl-addition polymerization of halogen-containing vinylic monomers or copolymerization of halogen-containing vinylic monomers with other vinylic monomers that may or may not contain halogen atoms. The halogen-containing precursor fiber may alternatively be produced by blending a halogen-containing polymer with a non-halogen-containing polymer. The resulting copolymer may be spun to make fibers according to methods well known in the art. In other embodiments, the halogen-containing precursor fiber is produced by halogenating a polymeric substrate, wherein the polymeric substrate may not contain halogen atoms (e.g., polyethylene or polypropylene) or may contain halogen atoms, such as any of the halogen-containing polymers provided above. The halogenation reaction may be effected by any of the known methods for halogenating a polymer. In particular embodiments, the halogenation reaction involves halogenating the polyolefin fiber with halogen molecules ($X_2$) in the presence of an irradiation source, wherein X represents Cl, Br, or I. The radiation source may be, for example, sunlight or artificial ultraviolet light. In some embodiments, the halogen molecules are included in an amount of at least 10 wt %, 15 wt %, 20 wt %, 25 wt %, 30 wt %, 35 wt %, 40 wt %, 45 wt %, or 50 wt %, calculated as (weight of halogenated polymer, after halogenation)/(weight of polymer before halogenation)×100.

In another aspect, the invention is directed to a method for extracting metal ions from a liquid solution containing metal ions. In the method, metal-binding fibers, as described above, are contacted with the metal-containing liquid solution to bind metal ions onto surfaces of the metal-binding fibers. If desired, the fibers may be chopped or ground into particulate form. The solution can be contacted in any manner that promotes or maximizes the binding of one or more metal ions on the metal-binding fibers or powder. The contact can be achieved by, for example, flowing the solution through a bundle, mesh, weave, or particles of the metal-binding composition. In some embodiments, the metal-binding fiber is selective for one or more metal ions. The metal-binding fiber can be made selective by, for example, functionalizing the metal-binding fiber with specific functional groups known to bind or chelate preferentially or only to a specific metal ion (e.g., amidoxime groups showing selective binding of one or more lanthanides and/or actinides, such as uranium). In the latter embodiment, one or more specific types of metal ions are selectively adsorbed, while one or more other metal ions are adsorbed at a lower adsorption capacity or not absorbed altogether.

The metal-containing liquid solution can be, for example, seawater or wastewater (e.g., radioactive waste) that contains metal ions. The metal-containing liquid may also be contaminated water that requires decontamination or purification to permit re-use. The metal ions particularly considered herein are the transition, lanthanide, and actinide metal ions. The transition metals can be selected from first-row, second-row, and third-row transition metals. Some examples of first-row transition metal ions include Sc, Ti, V, Cr, Mn, Fe, Co, Ni, Cu, and Zn in their various oxidation states. Some examples of second-row transition metal ions include Y, Zr, Nb, Mo, Ru, Rh, Pd, Ag, and Cd in their various oxidation states. Some examples of third-row transition metal ions include Hf, Ta, W, Re, Ir, Pt, Au. and Hg in their various oxidation states. Some examples of lanthanide metal species include any of the elements in the Periodic Table having an atomic number of 57 to 71, e.g., La, Ce, Pr, Nd, Sm, Eu, Gd, Tb, Dy, Ho, Er, Tm, Yb, and Lu in their known oxidation states. Some examples of actinide metal species include any of the elements in the Periodic Table having an atomic number of 90 to 103, i.e., ions of Th, Pa, U, Np, Pu, and Am.

In some embodiments, the metal-binding fiber binds alkali, alkaline earth, and/or main group metal ions, if such metal ions are present in the solution being treated. In some embodiments, the metal-binding fiber is substantially incapable of binding to alkali, alkaline earth, and/or main group metal ions, or the metal-binding fiber binds such metals in a significantly lesser capacity by weight or moles than one or more transition, lanthanide, or actinide metal species, if such metal ions are present in the solution being treated. Some examples of alkali metal species include $Li^+$, $Na^+$, $K^+$, and $Rb^+$. Some examples of alkaline earth metal species include $Be^{2+}$, $Mg^{2+}$, $Ca^{2+}$, and $Sr^{2+}$. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Si^{4+}$, $Ge^{4+}$, $Sn^{2+}$, $Sn^{4+}$, $Pb^{2+}$, $Pb^{4+}$, $N^{3+}$, $P^{3+}$, $P^{5+}$, $As^{3+}$, $As^{5+}$, $Sb^{3+}$, $Sb^{5+}$, and $Bi^{3+}$. The metal ions are generally present as salts, such as halide (e.g., fluoride, chloride, bromide, or iodide), sulfate, nitrate, carbonate, phosphate, bicarbonate, hydroxide, carboxylate (e.g., acetate), oxide, and sulfide salts of any of the foregoing metal ions.

In some embodiments, any one or more of the above metals are preferentially adsorbed or are preferentially not adsorbed, or any one or more of the above metals are present in the metal-containing solution while one or more metals may not be present or may have been earlier removed. In particular embodiments, metal-binding fibers functionalized with imino, oxime, amidoxime, imide dioxime, or hydroxamate groups are used for adsorption of metal ions from solution, particularly metal ions selected from transition metal, lanthanide, and actinide metal ions, and more particularly, for the adsorption of uranium, particularly from seawater or wastewater.

Examples have been set forth below for the purpose of illustration and to describe certain specific embodiments of the invention. However, the scope of this invention is not to be in any way limited by the examples set forth herein.

EXAMPLE 1

Functionalization of PVC-co-CPVC Fiber with Amidoxime Groups and Use Thereof for Extraction of Uranium from Seawater The following experiments involve SI-ATRP copolymerization of acrylonitrile (AN) and tert-butyl acrylate (tBA), a precursor for polyacrylic acid (PAA), from PVC-co-CPVC fiber for the preparation of fibrous uranium (U) adsorbents. Results with varied copolymer compositions, along with U adsorption results in U-spiked simulated seawater and actual seawater are reported. Other precursors for PAA, including 2-hydroxyethyl acrylate (HEA), 2-hydroxyethyl methacrylate (HEMA), ethyl 2-(hydroxymethyl)acrylate, 3-hydroxypropyl acrylate, 4-hydroxybutyl acrylate, or 3-(trimethoxysilyl)propyl methacrylate, may be used instead of tBA. As indicated, in some embodiments, it may be preferable for the PAA precursor to possess a hydrophilic group, such as a hydroxy-derivatized hydrocarbon group.

Preparation and Characterization of a Metal-Binding Fiber by SI-ATRP Deposition of Metal-Binding Polymeric Grafts on a Halogenated Precursor Fiber FIG. 1 is a general schematic of the process used. The top portion of FIG. 1 shows the chemical details of the process, while the bottom portion of FIG. 1 is a pictorial rendition of the same process. As shown in FIG. 1, synthesis of fibrous uranium adsorbents were achieved in three steps: 1) SI-ATRP of AN and tBA from labile chlorides on PVC-co-CPVC fiber, 2) amidoximation with hydroxylamine ($NH_2OH$), and 3) KOH conditioning. Step 1 resulted in the brush architecture of grafted functional polymers, P(AN-co-tBA). Amidoximation converted polyacrylonitrile (PAN) segments to polyacrylamidoxime (PAO) units, wherein the amidoxime groups have a high affinity for binding to uranyl (U) ions. The last step, KOH conditioning, serves to hydrolyze the ester groups in PtBA to carboxylate salts groups, thereby resulting in poly(acrylic acid) (PAA) segments. The KOH conditioning step also serves to convert any unreacted nitriles to carboxylate groups, thereby increasing hydrophilicity and the swelling of fibrous adsorbents in seawater.

The PVC-co-CPVC fiber used in this study is a copolymer between PVC and CPVC (specifically, Rhovyl® ZCS fiber tow), which is processed without any plasticizer, in the round fiber form (average diameter: 15.4±2.8 μm) and without any porosity, in order to not to add extra surface area. The measured wt % Cl from elemental analysis (EA) was 49.16%, which is lower than expected even for PVC (56.73%). This experimental value, 49.16%, was used in the calculation for moles of "alkyl chlorides" (RCl). For example, for each 150 mg of Rhovyl® fiber, (0.150 g×0.4916)/(35.453 g/mol of Cl)=2.08×10$^{-3}$ moles of RCl were present.

Due to the solubility of PVC fiber in various solvents and monomers, especially at elevated temperatures, ATRP conditions were limited to reactions in ethylene carbonate (EC) using a minimally elevated temperature (i.e., 65° C.), which still permitted reasonable growth rates of the polymers.

Me$_6$TREN was used as a ligand in this study, since Cu complexes with Me$_6$TREN were found to form particularly active catalysts in ATRP.

Typical SI-ATRP Procedures: CuCl$_2$.2H$_2$O (3.3 mg, 1.9× 10$^{-5}$ mol), PVC-co-CPVC fiber (150 mg, 2.08 mol VC repeating units), EC (40.6 mL, 50 vol %), tBA (27.9 mL, 0.190 mol), AN (12.7 mL, 0.190 mol), and Me$_6$TREN (106 mg, 4.55×10$^{-4}$ mol) were entered into a Schlenk flask equipped with a magnetic stirring bar. The flask was subjected to three freeze-pump-thaw (FPT) cycles. Then, CuCl (38.0 mg, 3.84×10$^{-4}$ mol) was added to the flask, under an argon flow, while the contents were at a solid state. The reaction mixture was subjected to another FPT cycle. The flask was placed in an oil bath with temperature equilibrated at 65° C. and the reaction was continued under a sealed argon atmosphere for 24 hours. The reaction was terminated by exposure to air. The fiber product was washed with DMSO until the supernatant was colorless, rinsed three times with methanol, and dried under vacuum at 40° C. at least overnight until constant weights were obtained. Degrees of grafting (d.g.) were calculated from 100× weight increase from grafting/weight of PVC-co-CPVC fiber.

Amidoximation and KOH Conditioning: The next step involves the amidoximation (AO) of AN groups in the polymer brush, followed by KOH treatment. AO was performed twice to ensure complete conversion of AN groups in grafted polymer chains, and a large excess of hydroxylamine (HA) was used each time. A volume of 6.0 mL of HA mixture (10 wt % in 1:1 (w/w) methanol/water) was added to 15±1 mg of the adsorbent. The first AO was performed for 48 hours at 80° C. The reaction mixture was then replaced by fresh HA mixture (6.0 mL), followed by the second AO (80° C., 24 hours). The fibers were then washed with deionized water until neutral pH was achieved and dried in a vacuum oven at 40° C. overnight, yielding constant weights. Prior to each U adsorption test, KOH treatment of the fibers was performed by adding 15.0 mL of 2.5 wt % KOH solution to an accurate weight of a dry amidoximated fiber (15.0±1.0 mg). The mixture was heated to 80° C. and maintained for 3 hours. The fibers were then filtered and washed with deionized water until neutral pH was observed. Care was taken to ensure that the fibers did not become dry, and no loss of fibers occurred at any step of the procedure.

Uranium Uptake in U-Spiked Simulated Seawater

In order to identify the optimal amount of catalyst, the ATRP grafting of AN under various amounts of CuCl, from 0.75 [CuCl]/993 [AN] to 2.0 [CuCl]/993 [AN], was performed along with the uranium uptake in simulated seawater on corresponding amidoximated fibers. U adsorption tests were performed on amidoximated, KOH-conditioned fibrous adsorbents, which were kept wet until the test. For simulated seawater tests, the preparation of U-spiked (5-7 ppm U) simulated seawater was made as previously reported (e.g., Gorka, et al., *J. Mater. Chem. A*, 2013, 1 (9), 3016-3026; and Yue, et al., *Science China-Chemistry* 2013, 56 (11), 1510-1515). Briefly, 17 mg UO$_2$(NO$_3$)$_2$.6H$_2$O, 25.6 g NaCl, and 193 mg NaHCO$_3$ were dissolved in DI water to make a 1 L solution. A mass of 15.0±1.0 mg fibers was shaken in 250 mL or 750 mL of simulated seawater solution (pH ~8) for 24 hours at room temperature. The amount of uranyl ion uptake was determined from the concentration difference between the beginning and the end of the test. The uranium adsorption capacity (mg/g) was calculated from $[(C_i-C_f) \text{ [mg/L]}] \times [\text{volume of solution [L]}]/[\text{mass of adsorbent [g]}]$, and % adsorbed was calculated from $[(C_i-C_f)/C_i] \times 100$, wherein $C_i$ and $C_f$ represent the initial and final solution concentrations.

The effect of the amount of catalyst on the degree of grafting (d.g.) and adsorption capacity is provided in Table 1 below. As shown in Table 1, with various catalyst amounts, the d.g. were not drastically different. However, due to the resulting higher d.g. and better performance in U uptake (i.e., higher U adsorption capacity and distribution coefficient, $K_d$), the [AN]/[RCl]/[CuCl]/[Me$_6$TREN]/[CuCl$_2$] ratio of 993:5.4:1.0:1.2:0.050 (Entry 1.2) was used as a guideline for the rest of this study. It is also worth mentioning that no homopolymerization was observed under the reaction conditions studied (i.e., no precipitate formed when the reaction mixture was added into 50% aqueous methanol solution).

TABLE 1

ATRP of AN under varied catalyst amounts and U uptake in 750-mL U-spiked simulated seawater.

| [AN]/[RCl]/[CuCl]/ [Me$_6$TREN]/[CuCl$_2$]$^a$ no. | d.g., % | adsorption capacity,$^{b,c}$ mg U/g | % adsorption$^d$ | $K_d$,$^e$ L/g |
|---|---|---|---|---|
| 1.1 993:5.4:0.75:0.90:0.038 | 408 | 94.1 | 30.0 | 22.2 |
| 1.2 993:5.4:1.0:1.2:0.050 | 437 | 116.5 | 37.4 | 30.7 |
| 1.3 993:5.4:1.5:1.8:0.075 | 362 | 63.5 | 26.0 | 17.7 |
| 1.4 993:5.4:2.0:2.4:0.10 | 356 | 106.6 | 35.9 | 28.2 |

$^a$Constant ratio between CuCl, Me$_6$TREN, and CuCl$_2$ (1 CuCl:1.2 Me$_6$TREN:0.05 CuCl$_2$), in 50 vol % EC, 65° C., 24 h.
$^b$Testing conditions: 15 mg adsorbent in 750 mL of 6-ppm U, 10123 ppm Na$^+$, 15529 ppm Cl$^-$, 140 ppm HCO$_3^-$, pH 8, 20-25° C., 24 h; ICP-OES at $\lambda_U$ 367.007 nm.
$^c$[(C$_i$ − C$_f$), mg/L] × [volume of solution, L]/[mass of adsorbent, g], where C$_i$ and C$_f$ represent the initial and final uranium concentrations.
$^d$% adsorption = [(C$_i$ − C$_f$)/C$_i$] × 100.
$^e$K$_d$ = [(C$_i$ − C$_f$), mg/L] × [volume of solution, L]/{[C$_f$, mg/L] × [mass of adsorbent, g]}

Figure 2:
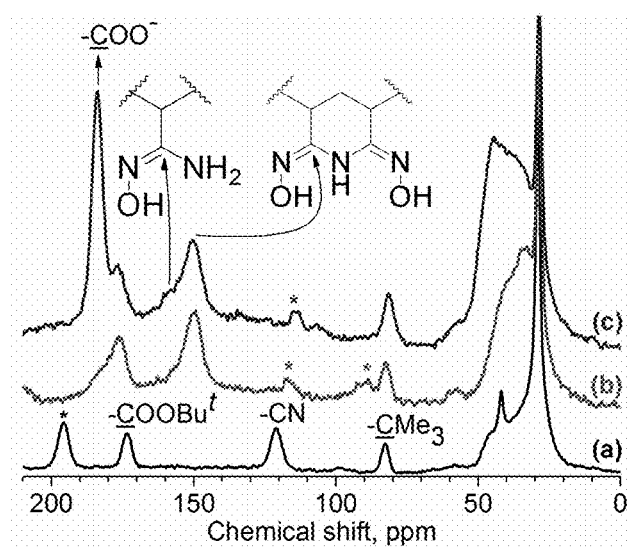
FIG. 2. Carbon-13 ($^{13}C$) CP/MAS NMR spectra of fibers at different stages of the preparation process. The spectral curves are as follows: (a) after grafting (spinning speed 7.5 kHz); (b) after amidoximation; and (c) after KOH treatment. The asterisk symbol (*) denotes spinning sideband (spinning speed 6.0 kHz, unless noted otherwise).

The presence of grafted PAN was also confirmed by solid-state $^{13}$C-NMR spectra of grafted fibers. FIG. 2 (curve a) shows the spectrum of CPVC, wherein only resonances from PVC (—CH$_2$—centered around 47 ppm, —CHCl— centered around 58 ppm) and CPVC portions (—CCl$_2$— centered at 97 and 91 ppm) were observed. In the spectrum of PVC-g-PAN (FIG. 2, curve b), new resonances from PAN (—CH$_2$—/CH centered around 29 ppm, CN centered around 121 ppm) were observed along with one distinct resonance from PVC at 58 ppm. The other resonance, at 47 ppm, from PVC was buried as an obscure shoulder underneath broad —CH$_2$—/CH signals from PAN. Curve c in FIG. 2 is the spectral curve corresponding to the fiber after KOH treatment.

With the fixed catalyst amount (from Entry 1.2), the [tBA]/[AN] feed ratio was varied in simultaneous copolymerization, and the results are shown in Table 2 below. From the [tBA]/[AN] feed ratios, mole fractions of AN in the feed, $F_{AN}$, were calculated and inputted into the third column of Table 2. The elemental analysis (especially N and O) of grafted fibers permitted the calculation of PtBA/PAN molar ratios, from which mole fractions of PAN in grafted fibers, $F_{PAN}$, were calculated (fourth column of Table 2). Overall, $F_{PAN}$ in the fiber decreased with the decreasing $F_{AN}$ in the feed, as expected. At high $F_{AN}$ (Entries 2.1 to 2.2 in Table 2), $F_{PAN}$ in the fiber were almost identical to $F_{AN}$ in the feed. On the other hand, at lower $F_{AN}$ (Entries 2.3 to 2.6 in Table 2), $F_{PAN}$ were significantly higher than $F_{AN}$ in the feed, which indicates a more efficient grafting of PAN than PtBA.

TABLE 2

Simultaneous copolymerization of tBA and AN and
U uptake in 750-mL U-spiked simulated seawater

| no. | [tBA]/[AN]$^a$ | $F_{AN}$ from feed$^b$ | $F_{PAN}$ from EA$^c$ | d.g., % | adsorption capacity,$^d$ mg U/g | % adsorption | $K_d$, L/g |
|---|---|---|---|---|---|---|---|
| 1.2 | 0:993 | 1.00 | 0.955 | 437 | 116.5 | 37.4 | 30.7 |
| 2.1 | 50:494 | 0.908 | 0.858 | 162 | 90.0 | 28.3 | 20.0 |
| 2.2 | 124:494 | 0.799 | 0.796 | 256 | 81.6 | 25.6 | 17.6 |
| 2.3 | 249:494 | 0.665 | 0.738 | 1390 | 174.7 | 60.3 | 75.1 |
| 2.4 | 371:494 | 0.571 | 0.679 | 1012 | 150.5 | 49.5 | 48.7 |
| 2.5 | 496:494 | 0.499 | 0.608 | 754 | 154.0 | 51.9 | 52.8 |
| 2.6 | 624:494 | 0.442 | 0.516 | 1527 | 118.0 | 40.3 | 32.7 |

$^a$[tBA]/[AN]/[RCl]/[CuCl]/[Me$_6$TREN]/[CuCl$_2$] = the above monomer ratios: 5.4:1.0:1.2: 0.05, in 50 vol % EC, 65° C., 24 h.
$^b$mole fraction of AN = (moles of AN in the feed)/(total moles of monomers in the feed)
$^c$mole fraction of PAN = (moles of PAN from EA)/(moles of PAN from EA + moles of PtBA from EA)
$^d$Testing conditions: 15 mg adsorbent in 750 mL of 6-ppm U, 10123 ppm Na$^+$, 15529 ppm Cl$^-$, 140 ppm HCO$_3^-$, pH 8, 20-25° C., 24 h; ICP-OES at $\lambda_U$ 367.007 nm.

Overall, under studied conditions, especially at lower $F_{AN}$ (Entries 2.3 to 2.6 in Table 2), high d.g., ≥754%, were obtained—even from minute amounts of labile chloride initiation sites. These d.g. were much higher than d.g. normally obtained from RIGP grafting of functional monomers from trunk fibers (e.g., Seko, et al., *Separ. Sci. Technol.*, 2004, 39 (16), 3753-3767). The much lower d.g observed at high $F_{AN}$ (Entries 1.2 and 2.1 to 2.2 in Table 2), might have been the result of termination or side reactions of AN radicals that were present at high concentrations under these conditions. Termination of side reactions of AN radicals might also account for the suppressed reactivity of AN, resulting in almost identical $F_{PAN}$ and $F_{AN}$ (Entries 2.1 to 2.2 in Table 2).

Figure 3:
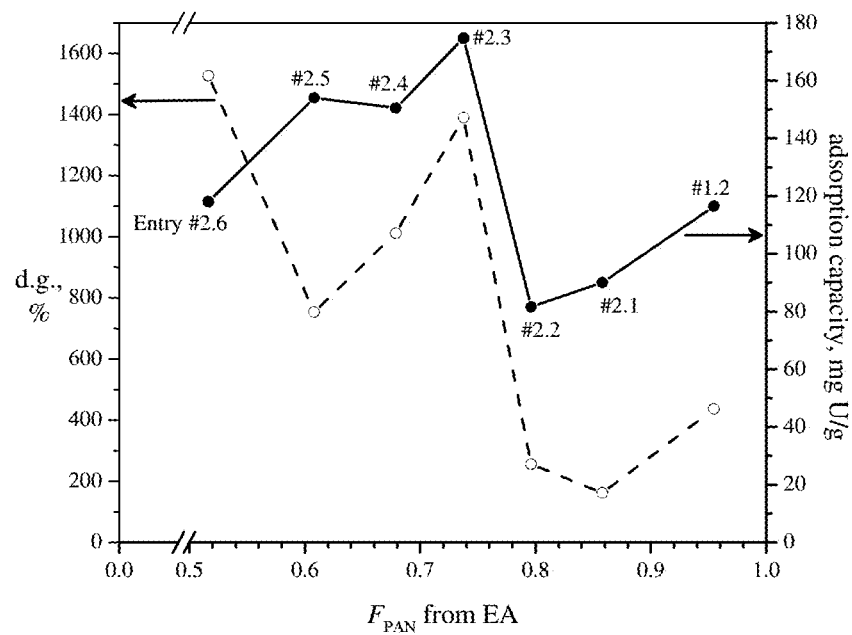
FIG. 3. Graph showing degree of grafting (d.g.) (dashed line) and U uptake in 750-mL U-spiked simulated seawater (solid line), in relation to mole fraction of PAN in the graft chain. The labels on adsorption capacity data points are entry numbers from Table 2.

A screening test in search for adsorbents with high U adsorption capacities was conducted in simulated seawater, spiked with 6-ppm U (Table 2, last three columns). In order to demonstrate the relationship between d.g., adsorption capacity, and mole fraction of PAN, $F_{PAN}$, these data from Table 2 were plotted, as provided in the graph in FIG. 3. As shown in FIG. 3, the trend in adsorption capacities closely followed the trend in d.g., except at the lowest $F_{PAN}$ (Entry 2.6 from Table 2). At the lowest $F_{PAN}$, although the adsorbent possessed the highest d.g., the adsorption capacity drastically dropped. This indicates an interplay of another, less dominant factor, the ratio of functional ligand (from PAN) to hydrophilic group (from PtBA). Among these adsorbents, the adsorbent with a high grafting yield and the optimal ligand to hydrophilic group ratio (i.e., $F_{PAN}$ ca. 0.74) showed the highest U adsorption capacity and $K_d$ (Table 2, Entry 2.3). Due to this interplay between two factors (i.e., d.g. and $F_{PAN}$), the optimal $F_{AN}$ in feed ratio for maximum U uptake ($F_{AN}$=0.67 and $F_{PAN}$=0.74) was slightly different from that reported by Seko et al. (supra) (i.e., AN/MA=7:3 wt/wt, corresponding to $F_{AN}$ 0.79) on PE-grafted P(AN-co-MA) by RIGP.

Uranium Uptake in Seawater

Fibrous adsorbents showing high U adsorption capacities, ≥150 mg U/g, in the U-spiked simulated seawater (Table 2, Entries 2.3 to 2.5) were selected for continuous-flow experiments in seawater at the Marine Sciences Laboratory of Pacific Northwest National Laboratory (PNNL) at Sequim Bay, Wash. A mass of ~60 mg of adsorbent was packed in a flow-through column of 1-inch diameter and 6-inch height. The adsorbent was uniformly distributed in the column volume and held in place by adding glass beads of 3-mm diameter. Marine testing was performed using filtered (0.45 µm) seawater at a temperature of 20±2° C. and at a flow rate of 250-300 mL/min) using active pumping through a multi-channel flow system.

Table 3, below, shows U uptake results from the kinetic study on fiber no. 2.3 and from the equilibrium study on fiber nos. 2.3 through 2.5. As shown in Table 3, after 48.6-day exposure to seawater, fiber no. 2.3, which showed the highest U adsorption capacity in simulated seawater (Table 2), also showed the highest salinity-normalized adsorption capacity, 5386 µg U/g, in seawater. Fiber nos. 2.4 and 2.5 showed lower salinity-normalized adsorption capacities of 3058 µg U/g (48.6 days) and 2549 µg U/g (42.3 days), respectively, as observed in simulated seawater. Adsorption capacities obtained with these fibers were much higher than those observed in JAEA reference fibers, 1761 µg U/g (48.6 days) and 1657 µg U/g (42.3 days). Although adsorbents used in this study were grafted from a round fiber without additional surface area, the adsorption capacity of fiber no. 2.3 (i.e., 5386 µg U/g or 5.386 mg U/g) was unprecedentedly high, compared to those of adsorbents grafted from materials with high surface areas (e.g., Yue, et al, *Angew. Chem.-Int. Edit.*, 2013, 52 (50), 13458-13462; Kim, et al., *Separation Science and Technology*, 2013, 48 (3), 367-387; Kim, et al., *Ind. Eng. Chem. Res.*, 2013, 52 (27), 9433-9440; and Gorka, et al., *J. Mater. Chem. A*, 2013, 1 (9), 3016-3026).

TABLE 3

U uptake in seawater at Sequim Bay, W A.

| no. | exposure time, days | adsorption capacity, µg U/g | salinity-normalized adsorption capacity,$^a$ µg U/g |
|---|---|---|---|
| 2.3$^b$ | 0.0 | 7.87 | 9 |
| 2.3$^b$ | 6.8 | 2198 | 2522 |
| 2.3$^b$ | 14.7 | 2826 | 3243 |
| 2.3$^b$ | 24.9 | 4611 | 5292 |
| 2.3$^b$ | 48.6 | 4694$^c$ | 5386$^c$ |
| 2.4$^b$ | 48.6 | 2664$^c$ | 3058$^c$ |
| 2.5$^d$ | 42.3 | 2279$^e$ | 2549$^e$ |

$^a$Normalized to salinity of 35 psu.
$^b$Ca. 0.060 g fiber, seawater flow rate 250-300 mL/min, temperature 20° C., average salinity = 30.5 ± 0.5 psu.
$^c$Compared with the JAEA reference fiber measured simultaneously, adsorption capacity 1535 µg U/g and salinity normalized adsorption capacity 1761 µg U/g (48.6 days).
$^d$Ca. 0.060 g fiber, seawater flow rate 250-300 mL/min, temperature 20° C., average salinity = 31.3 psu.
$^e$Compared with the JAEA reference fiber measured simultaneously, adsorption capacity 1482 µg U/g and salinity normalized adsorption capacity 1657 µg U/g (42.3 days).

Figure 4:
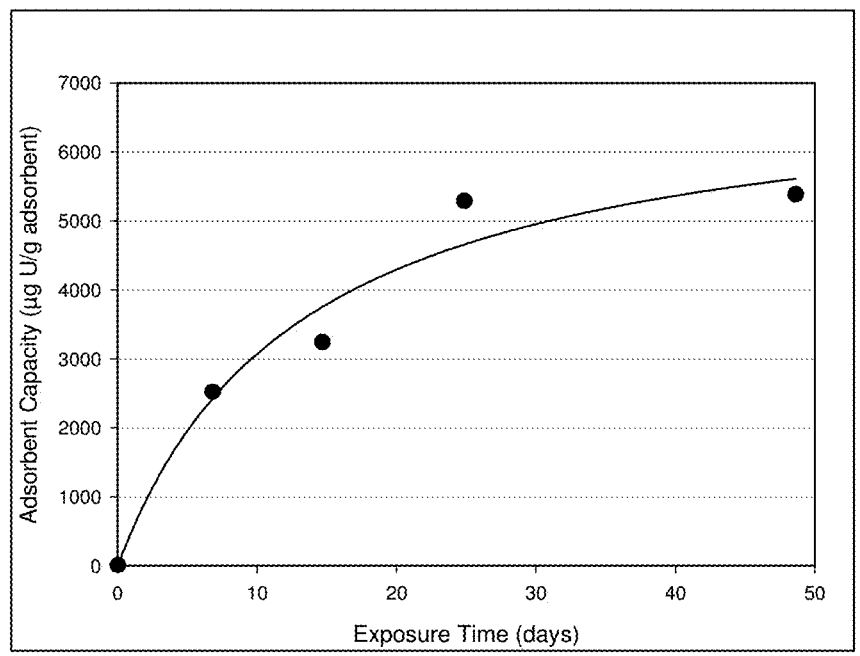
FIG. 4. Graph showing kinetic plot of uranium (U) uptake of fiber no. 2.3 in seawater at Sequim Bay, Wash., with one site ligand saturation modeling (saturation capacity 7150±1100 µg/g, half saturation time 13±6 days; salinity normalized to 35 psu).

The data from Table 3 is plotted in the graph in FIG. 4. As shown in FIG. 4, the kinetic plot of the uranium uptake of fiber no. 2.3 revealed a fast uranium adsorption (half saturation time 13±6 days). At 24.9-day exposure, the salinity-normalized adsorption capacity was already 5292 µg U/g (or 5.292 mg U/g) (Table 3). The observed fast kinetics of U uptake was unprecedented compared to other adsorbents tested in seawater, with half saturation time normally around 22-26 days (e.g., Kim, et al., *Ind. Eng. Chem. Res.*, 2013, 52 (27), 9433-9440). The fast kinetics likely resulted from a few (i.e., limited in number) initiation sites that were far apart on the PVC-co-CPVC fiber, compared to closer (i.e., more crowded) initiation sites expected on RIGP grafted PE fibers (dependent on irradiation parameters). Due to the high reactivity of AN, these graft chains grew very long. These long, functional graft chains, far apart from each other, had room to spread out, instead of being entangled, which facilitated the access of uranyl ions from seawater.

Table 4, below, shows the results of multi-element ICP-OES analysis of the uptake performed on fiber nos. 2.3 and 2.4, in comparison with JAEA reference fiber, at 48.6-day exposure. Along with the results, the average abundance of metal ions in seawater from two literature sources were listed (Turekian, K. K., Oceans. Prentice-Hall: 1968; and Gupta, C. K.; Singh, H., Uranium Resource Processing: Secondary Resources. Springer-Verlag: Berlin, Germany, 2003) in Table 4, second column. Overall, total adsorption capacities of these fibers followed the same trend as their U adsorption capacities (i.e., no. 2.3>no. 2.4>>JAEA fiber). In terms of relative amounts of U adsorbed, fiber no. 2.3 contained U at ca. 4 wt %/total weight of analyzed metals. Fiber no. 2.4 and JAEA fiber contained slightly less U wt %, ca. 3%. As expected, the major components of dissolved salts in seawater, magnesium (Mg), calcium (Ca), and sodium (Na), were the major adsorbed metals (combined wt %=79-84%) on all three adsorbents. Next, vanadium (V) was adsorbed at about 10 wt % of the total metal weight, which is higher than the U uptake. The weight ratio of U uptake per V uptake (U/V ratio) on fiber no. 2.3 was 0.40, which is similar to that of JAEA fiber (0.41). Fiber no. 2.4, which had lower total adsorption capacity and lower U adsorption capacity than fiber no. 2.3, had even lower U/V ratio (0.25) than those of fiber 2.3 and JAEA fiber.

Other metal ions present in seawater at concentrations comparable to U, iron (Fe), copper (Cu), zinc (Zn), and nickel (Ni), constituted the combined 4.4 to 4.5 wt % on fiber nos. 2.3 and 2.4, and 3.1 wt % on the JAEA fiber. Potassium (K), which is a major ion in seawater, contributed to about 1 wt % on fiber nos. 2.3 and 2.4. Other metal ions, including abundant strontium (Sr) ions, with comparable abundance to U (i.e., molybdenum (Mo) and titanium (Ti)), and less abundant ions, chromium (Cr), cobalt (Co), and manganese (Mn), altogether contributed to only 0.4-0.5 wt % on all three fibers.

Table 5, below, shows the kinetics of the uptake of various metal ions on fiber no. 2.3. The sum of adsorption capacities of metal ions reached a range of constant values, 126325-127515 μg/g, after 6.8 days (except at 14.7-day exposure where the sum of adsorption capacities was anomalously large, mainly due to a surge in Na uptake). While the sum of adsorption capacities remained quite constant, adsorption capacities of U and most transition metal ions (i.e., V, Fe, Cu, Ni, Ti, Cr, Mo, Co, Mn) continually increased with longer exposure time, even up to 48.6 days. This indicates long-term accessibility to binding sites and, likely, the formation of thermodynamically stable complexes with these metal ions, which are present at much lower concentrations in seawater than main group metal ions (i.e., Mg, Ca, Na, K, Sr).

TABLE 4

Uptake of various metal ions on fiber nos. 2.3 and 2.4, and JAEA reference fiber in seawater at Sequim Bay, WA, at 48.6 days.

| metal | average concentration in seawater at 3.5% salinity,[a] μg/g or ppb | fiber no. 2.3 adsorption capacity,[b] μg/g | % of sum | fiber no. 2.4 adsorption capacity,[b] μg/g | % of sum | JAEA reference fiber adsorption capacity,[b] μg/g | % of sum |
|---|---|---|---|---|---|---|---|
| Mg | $1.326 \times 10^6$; $1.290 \times 10^6$ | 44736 | 35 | 34076 | 37 | 19862 | 44 |
| Ca | $4.22 \times 10^5$; $3.92 \times 10^5$ | 32662 | 26 | 24735 | 27 | 14399 | 32 |
| Na | $1.105 \times 10^7$; $1.08 \times 10^7$ | 25544 | 20 | 14293 | 15 | 3757 | 8.4 |
| V | 1.5; 1.9 | 11637 | 9.2 | 10827 | 12 | 3708 | 8.3 |
| U | 3.3; 3.3 | 4694 | 3.7 | 2664 | 2.9 | 1535 | 3.4 |
| Fe | no data; 3.4 | 2654 | 2.1 | 2486 | 2.7 | 605 | 1.3 |
| Cu | 3.0; 0.9 | 1624 | 1.3 | 1666 | 1.8 | 457 | 1.0 |
| K | $4.16 \times 10^5$; $3.92 \times 10^5$ | 1226 | 1.0 | 839 | 0.90 | | |
| Zn | 5.0; 5.0 | 801 | 0.63 | 650 | 0.70 | 219 | 0.49 |
| Ni | no data; 6.6 | 418 | 0.33 | 277 | 0.30 | 141 | 0.31 |
| Sr | $8.5 \times 10^5$; $8.1 \times 10^3$ | 242 | 0.19 | 189 | 0.20 | 115 | 0.26 |
| Ti | no data; 1.0 | 153 | 0.12 | 146 | 0.16 | 36 | 0.080 |
| Cr | no data; 0.2 | 56.1 | 0.044 | 52.1 | 0.056 | 13.3 | 0.030 |
| Mo | 10; 10 | 53.1 | 0.042 | 16.8 | 0.018 | 2.38 | 0.0053 |
| Co | no data; 0.39 | 31.5 | 0.025 | 26.9 | 0.029 | 16.8 | 0.038 |
| Mn | 2.0; 0.4 | 13.9 | 0.011 | 10.2 | 0.011 | 3.13 | 0.0070 |
| sum | | 126546 | | 92954 | | 44870 | |

[a]Sources in the respective order: (1) Gupta, C. K.; Singh, H., *Uranium Resource Processing: Secondary Resources*. Springer-Verlag: Berlin, Germany, 2003; (2) Turekian, K. K., *Oceans*. Prentice-Hall: 1968.
[b]Not salinity normalized, average salinity = 30.5 ± 0.5 psu.

TABLE 5

Kinetics of the uptake of various metal ions on fiber no. 2.3 in seawater at Sequim Bay, WA, compared with literature data on amidoxime fiber, prepared by RIGP, in seawater.

| metal | exposure time 0.0 day adsorption capacity,[a] µg/g | exposure time 6.8 days adsorption capacity,[a] µg/g | exposure time 14.7 days adsorption capacity,[a] µg/g | exposure time 24.9 days adsorption capacity,[a] µg/g | exposure time 48.6 days adsorption capacity,[a] µg/g | Suzuki et al.,[b] exposure time 30 days adsorption capacity, µg/g |
|---|---|---|---|---|---|---|
| Mg | 39236 | 44890 | 44960 | 46312 | 44736 | 13100 |
| Ca | 27280 | 36142 | 34019 | 34564 | 32662 | 12700 |
| Na | 19894 | 33588 | 58387 | 24928 | 25544 | |
| V  | 2.24 | 4076 | 5521 | 10173 | 11637 | 1800 |
| U  | 7.87 | 2198 | 2826 | 4611 | 4694 | 576 |
| Fe | 51 | 1117 | 1243 | 2361 | 2654 | 401 |
| Cu | 398 | 730 | 884 | 1439 | 1624 | 17.7 |
| K  | 1000 | 1923 | 2653 | 1288 | 1226 | |
| Zn | 18.6 | 989 | 1095 | 936 | 801 | 111 |
| Ni | 1.3 | 312 | 348 | 382 | 418 | 169 |
| Sr | 203 | 223 | 235 | 252 | 242 | |
| Ti | 7.22 | 71.8 | 75.1 | 138 | 153 | |
| Cr | 3.0 | 26.0 | 25.2 | 47.3 | 56.1 | |
| Mo | 4.2 | 25.0 | 33.0 | 45.9 | 53.1 | |
| Co | 0.2 | 8.5 | 11.1 | 29.7 | 31.5 | 10.6 |
| Mn | 0.53 | 6.72 | 5.50 | 8.18 | 13.9 | 78.0 |
| sum | 88107 | 126325 | 152321 | 127515 | 126546 | 28963 |

[a]Ca. 0.060 g fiber no. 2.3, seawater flow rate 250-300 mL/min, temperature 20° C., not salinity normalized, average salinity at Sequim Bay, Washington, USA = 30.5 ± 0.5 psu.
[b]Ca. 0.070 g fiber, immersed in seawater 6 km off Mutu-Sekine Hama, Japan. Source: Suzuki, T.; Saito, K.; Sugo, T.; Ogura, H.; Oguma, K., Fractional elution and determination of uranium and vanadium adsorbed on amidoxime fiber from seawater. *Anal Sci* 2000, 16 (4), 429-432.

Figure 5:
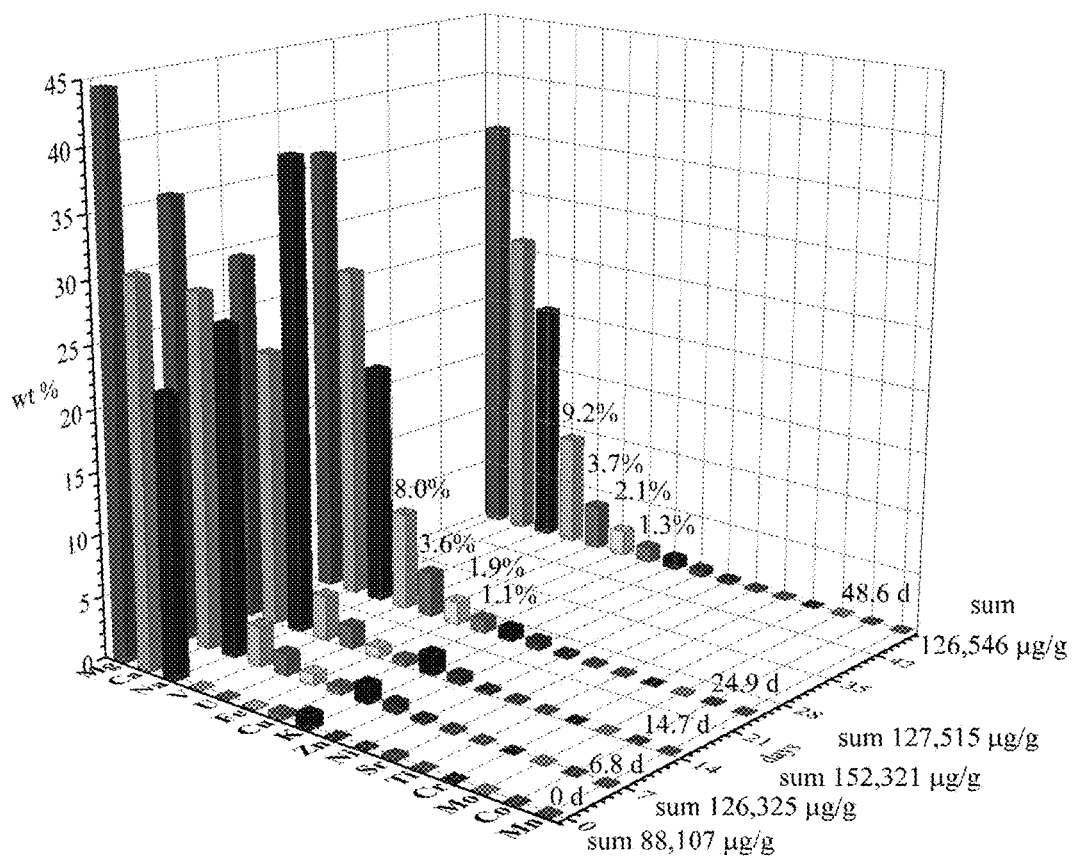
FIG. 5. Graph showing various metal ion uptakes (wt % metals) at different exposure times in seawater at Sequim Bay, Wash., with sums of metal uptakes listed (not salinity normalized, average salinity=30.5±0.5 psu).

To depict relative ratios of adsorbed metal ions, wt % of metal ions was plotted against exposure time, as provided in the plot in FIG. 5. Of particular note is the similarity between 24.9-day and 48.6-day exposure times, where wt % of most metal ions, except V, only slightly changed. This may indicate that the equilibrium of the adsorption for most metal ions had been reached after only 24.9 days of being exposed to seawater.

Table 6, below, shows the kinetics of the uptake of U versus V on fiber no. 2.3 in seawater. As shown in Table 6, the U adsorption capacity/V adsorption capacity ratio (U/V ratio) of fiber no. 2.3 decreased over time, which corresponds to a decrease in the selectivity of the fiber toward U, versus V. The foregoing result demonstrates the importance of fast kinetics for high U adsorption. To further improve the economic feasibility of this technology, adsorbents with higher selectivity toward U, along with nondestructive elution process especially for V, are needed. With SI-ATRP grafting, however, new functional groups, including designed ligands with high selectivity toward U and hydrophilic groups with less affinity for other metal ions, can be grafted in high yields from CPVC or other mechanically strong chlorinated fibers.

TABLE 6

Kinetics of the uptake of U versus V on fiber no. 2.3 in seawater at Sequim Bay, W A.

| exposure time, days | V adsorption capacity, µg/g | U adsorption capacity, µg/g | U/V ratio |
|---|---|---|---|
| 0.0 | 2.24 | 7.87 | |
| 6.8 | 4076 | 2198 | 0.54 |
| 14.7 | 5521 | 2826 | 0.51 |
| 24.9 | 10173 | 4611 | 0.45 |
| 48.6 | 11637 | 4694 | 0.40 |

In summary, PVC-co-CPVC fiber was shown to be an active SI-ATRP initiator for simultaneous grafting of AN and tBA, resulting in functional fibers with high grafting yields. Uranium adsorption experiments in simulated and real seawater showed that the fibrous adsorbent with the highest adsorption capacity possessed a high grafting yield and the optimal ligand to hydrophilic group ratio. A high uranium adsorption capacity, 5.386 mg U/g (48.6 days), and an unprecedentedly fast kinetic of the adsorption were measured in seawater. Fibrous adsorbents also adsorbed other metal ions in the following order: Mg>Ca>Na>V>U>Fe>Cu>K>Zn>Ni>Sr>Ti>Cr>Mo>Co>Mn. The selectivity of the fiber toward U versus V decreased with time, implying the significance of a fast U adsorption kinetic. Overall, a fast and efficient U adsorbent in the fiber form was successfully prepared by SI-ATRP. This method is applicable to grafting other functional polymers from chlorinated fibers.

EXAMPLE 2

Halogenation and Amidoximation of Polypropylene (PP) Fiber and Use Thereof for Extraction of Uranium from Seawater In a similar manner to the above work on surface-initiated atom-transfer radical polymerization (SI-ATRP) from a commercial PVC fiber (Rhovyl® ZCS), the following work investigated the preparation of uranium adsorbents by SI-ATRP grafting from halogenated fibers.

Halogenation of Polypropylene Fiber

Trunk fibers were prepared by free-radical chlorination or bromination of polypropylene (PP) round fiber according to the following general schemes:

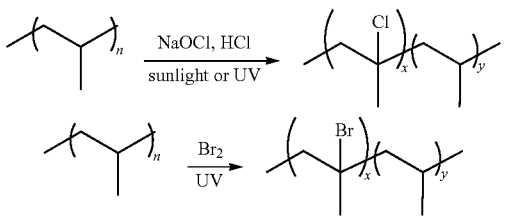

In chlorination, chlorine gas ($Cl_2$) was generated in-situ by the reaction of sodium hypochlorite (NaOCl) and hydrochloric acid (HCl) and chlorine free radicals were generated either under sunlight or by UV irradiation (Shah, et al., Textile Research Journal, 1983, 53 (5), 274-281). In bromination, bromine radicals were generated by UV irradiation of liquid bromine (Balamurugan, et al., Polymer 2001, 42 (6), 2501-2512). Chlorinated PP fibers were also characterized by solid-state $^{13}C$-NMR which confirmed the successful chlorination of PP fibers.

Chlorination Procedure: A 15% HCl solution was kept under a nitrogen atmosphere. To a Schlenk flask, PP fiber (0.60 g) and 10% NaOCl (30.7 mL) were added, evacuated and refilled with nitrogen three times. Under a nitrogen atmosphere, 15% HCl solution (6.10 mL) was added dropwise and the reaction vessel was sealed. The chlorination was continued either under sunlight or under a UV lamp in a quartz Schlenk at a 1.5-cm distance (ca. 46° C.), for the amount of time listed in Table 7, below. The reaction was terminated by exposure to air. The fiber was then washed with DI water until neutral pH, rinsed with methanol, and dried under vacuum at 40° C. at least overnight until constant weights were obtained. The wt % Cl was calculated from 100× weight increase from grafting/weight of PP fiber.

Bromination Procedure: PP fiber (0.050 g) in a quartz Schlenk flask was evacuated and refilled with nitrogen three times. Under a nitrogen atmosphere, 0.10 mL liquid $Br_2$ (b.p. 58.8° C.) was injected and the quartz Schlenk flask was sealed. The bromination was continued under a UV lamp at a 7-cm distance (ca. 46° C.), for the amount of time listed in Table 7. The reaction was terminated by an exposure to air. The fiber was then washed with DI water until neutral pH, rinsed with methanol and dried under vacuum at 40° C. at least overnight until constant weights were obtained. The wt % Br was calculated from 100× weight increase from grafting/weight of PP fiber.

A series of halogenation experiments were conducted with varying conditions, all of which are provided in Table 7 below.

TABLE 7

Chlorination and bromination of PP round fiber.

| no. | $X_2$ | irradiation source | time, h | wt % Cl, by gravimetric method |
|---|---|---|---|---|
| 1.1 | $Cl_2$ | sunlight | 1 | 7 |
| 1.2 | $Cl_2$ | sunlight | 2 | 19-20 |
| 1.3 | $Cl_2$ | sunlight | 3 | 27-30[a] |
| 1.4 | $Cl_2$ | UV | 1 | 26-33 |
| 1.5 | $Cl_2$ | UV | 1 h, twice | 41-43 |
| 1.6 | $Cl_2$ | UV | 2 | 37-45[b] |
| 1.7 | $Br_2$ | UV | 2.4 | 12 |

[a] Elemental analysis: empirical formula $CH_{1.97}Cl_{0.11}$ (compared to $CH_2$ for PP), and 19.86 wt % Cl (compared to 49.16 wt % Cl in Rhovyl® ZCS tow).
[b] Fibers became brittle.

Preparation of Uranium Adsorbents by SI-ATRP from Halogenated PP Fibers

Figure 6:
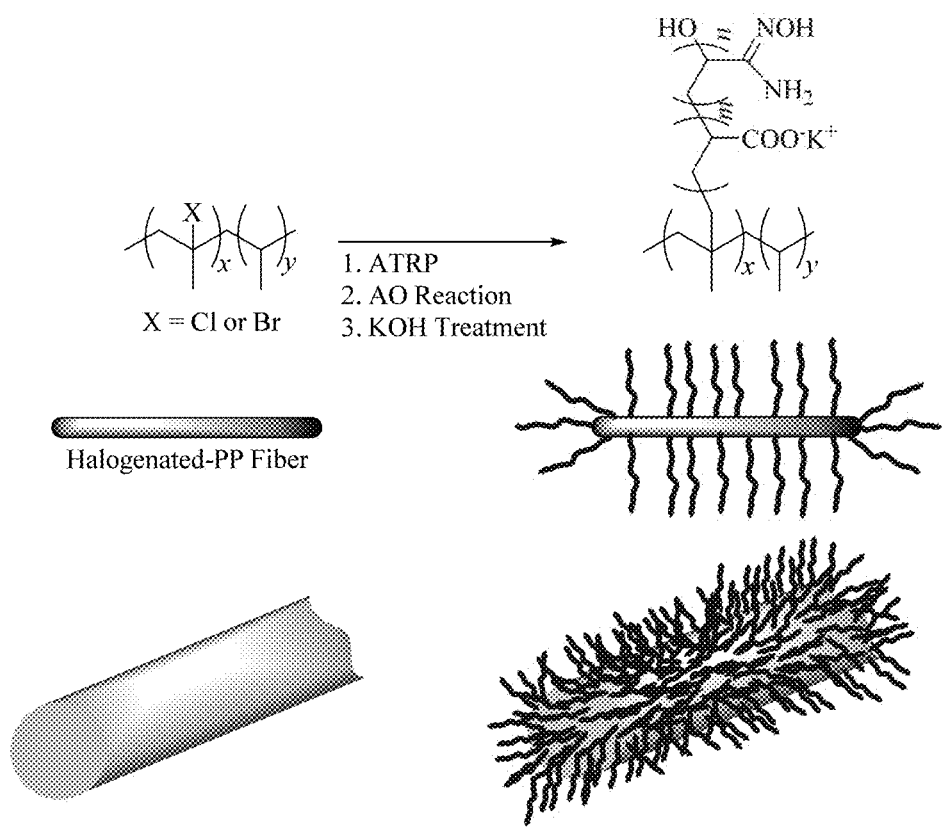
FIG. 6. Schematic showing a process for preparing fibrous metal-binding adsorbents from halogenated PP fibers, wherein a first step is an ATRP process for attaching to the fiber polymeric grafts containing nitrile and carboxy ester groups, a second step is conversion of the nitrile groups to amidoxime groups, and a third step is conversion of the carboxy ester groups to carboxylate salt groups by base hydrolysis. The top portion of FIG. 6 shows the chemical details of the process, while the bottom portion of FIG. 6 provides a pictorial rendition of the starting halogenated (precursor) fiber (left) and resulting grafted fiber (right).

A general schematic of the ATRP process on halogenated PP fibers is provided in FIG. 6. The top portion of FIG. 6 shows the chemical details of the process, while the bottom portion of FIG. 6 is a pictorial rendition of the same process.

In a similar manner to the preparation of uranium adsorbents from Rhovyl® ZCS fiber, SI-ATRP grafting of acrylonitrile (AN) and tent-butyl acrylate (tBA) from halogenated PP fibers, followed by amidoximation, and potassium hydroxide conditioning were preformed, yielding fibrous adsorbents. For the solvent, 50 vol % DMSO was used instead of ethylene carbonate. The stoichiometry of components in the SI-ATRP process is provided in Table 8, below. Amidoximation (AO) was performed twice to ensure complete conversion of AN groups in grafted polymer chains, and a large excess of hydroxylamine (HA) was used each time. A volume of 6.0 mL of HA mixture (10 wt % in 1:1 (w/w) methanol/water) was added to 15±1 mg of the adsorbent. The first AO was performed for 48 hours at 80° C. The reaction mixture was then replaced by fresh HA mixture (6.0 mL), followed by the second AO (80° C., 24 hours). The fibers were then washed with deionized water until neutral pH was achieved, and dried in a vacuum oven at 40° C. overnight, yielding constant weights. Prior to each U adsorption test, KOH treatment of the fibers was performed by adding 15.0 mL of 2.5 wt % KOH solution to an accurate weight of a dry amidoximated fiber (15.0±1.0 mg). The mixture was heated to 80° C. and maintained for 3 hours. The fibers were then filtered and washed with deionized water until neutral pH was observed. Care was taken to ensure that the fibers did not become dry, and no loss of fibers occurred at any step of the procedure.

Fibrous adsorbents were tested in 6-ppm uranium-spiked simulated seawater solution, which was prepared as described above in Example 1. Adsorbents that showed promising performance in 250-mL simulated seawater test were tested in 750-mL simulated seawater, and the results are shown in Table 8 below.

TABLE 8

Simultaneous copolymerization of AN and tBA from halogenated PP fibers and U uptake in U-spiked simulated seawater.

| no. | halogenation condition in previous step | [AN]/[tBA] in the feed[a] | $F_{AN}$ in the feed[b] | d.g., % | adsorption capacity in 250-mL test,[c] mg U/g | adsorption capacity in 750-mL test,[c] mg U/g |
|---|---|---|---|---|---|---|
| 1.2.1 | $Cl_2$, sunlight 2 h (entry 1.2, 19 wt % Cl) | 1000:100 | 0.909 | 231 | 23.0 | |
| 1.2.2 | $Cl_2$, sunlight 2 h (entry 1.2, 19 wt % Cl) | 200:160 | 0.556 | 119 | 39.3 | |

TABLE 8-continued

Simultaneous copolymerization of AN and tBA from halogenated PP fibers and U uptake in U-spiked simulated seawater.

| no. | halogenation condition in previous step | [AN]/ [tBA] in the feed[a] | $F_{AN}$ in the feed[b] | d.g., % | adsorption capacity in 250-mL test,[c] mg U/g | adsorption capacity in 750-mL test,[c] mg U/g |
|---|---|---|---|---|---|---|
| 1.2.3 | Cl$_2$, sunlight 2 h (entry 1.2, 20 wt % Cl) | 200:160 | 0.556 | 127 | 40.1 | |
| 1.2.4 | Cl$_2$, sunlight 2 h (entry 1.2, 19 wt % Cl) | 500:400 | 0.556 | 439 | 72.6 | 86.5 |
| 1.3.1 | Cl$_2$, sunlight 3 h (entry 1.3, 29 wt % Cl) | 500:0 | 1.00 | 425 | | 83.2 |
| 1.3.2 | Cl$_2$, sunlight 3 h (entry 1.3, 29 wt % Cl) | 500:100 | 0.833 | 477 | | 111.9 |
| 1.3.3 | Cl$_2$, sunlight 3 h (entry 1.3, 29 wt % Cl) | 500:200 | 0.714[d] | 822 | | 132.9 |
| 1.3.4 | Cl$_2$, sunlight 3 h (entry 1.3, 29 wt % Cl) | 500:300 | 0.625[e] | 1000 | | 96.9 |
| 1.3.5 | Cl$_2$, sunlight 3 h (entry 1.3, 29 wt % Cl) | 500:400 | 0.556 | 1255 | 74.8 | 146.6 |
| 1.3.6 | Cl$_2$, sunlight 3 h (entry 1.3, 29 wt % Cl) | 500:500 | 0.500 | 1508 | 70.7 | 99.9 |
| 1.3.7 | Cl$_2$, sunlight 3 h (entry 1.3, 29 wt % Cl) | 500:600 | 0.455 | 2570 | 84.3 | 102.5 |
| 1.5.1 | Cl$_2$, UV 1 h twice (entry 1.5, 41 wt % Cl) | 200:160 | 0.556 | 255 | 52.6 | |
| | Cl$_2$, UV 1 h twice (entry 1.5, 41 wt % Cl) | 200:160 | 0.556 | 125 | 30.7 | |
| | Cl$_2$, UV 2 h (entry 1.6, 45 wt % Cl) | 200:160 | 0.556 | 55 | 45.6 | |
| 1.7.1 | Br$_2$, UV 2.4 h (entry 1.7, 12 wt % Br) | 1000:1000 | 0.500 | 133 | 22.8 | |

[a][AN]/[tBA]/[RCl]/[CuCl]/[Me$_6$TREN]/[CuCl$_2$] = the above monomer ratios: 1.0 (from gravimetric method): 1.0:1.2:0.05, in 50 vol % DMSO, 65° C., 24 h.
[b]mole fraction of AN = (moles of AN in the feed)/(total moles of monomers in the feed)
[c]Testing conditions: 15 mg adsorbent in 6-ppm U, 10123 ppm Na$^+$, 15529 ppm Cl$^-$, 140 ppm HCO$_3^-$, pH 8, 20-25° C., 24 h; ICP-OES at $\lambda_U$ 367.007 nm.
[d]mole fraction of PAN from elemental analysis (EA) of fiber = 0.792, calculated from (moles of PAN from EA)/(moles of PAN from EA + moles of PtBA from EA).
[e]mole fraction of PAN from EA of fiber = 0.715.

Halogenated PP fibers were effective as ATRP initiators, resulting in grafted PAN and PtBA at various degrees of grafting (d.g.). In general, the descending order of uranium adsorption capacities, according to the type of backbone fibers, was found to be as follows: PP chlorinated under sunlight>PP chlorinated under UV~brominated PP fiber. Compared with adsorption capacities obtained from identical 250-mL U-spiked tests on conventional adsorbents, including adsorbent fiber provided by the Japan Atomic Energy Agency (JAEA) prepared by RIGP (~20 g/kg), METSORB 16/60 (25.2 g/kg), METSORB STP (12.3 g/kg), METSORB HMRP 50 (46.3 g/kg), and Dyna Aqua (21.2 g/kg), adsorbent fibers prepared via ATRP from chlorinated PP and brominated PP fibers gave comparable or higher U adsorption capacities. Adsorbent fibers with high U adsorption capacities in the 250-mL spiked test were selected for the 750-mL spiked test, in which all adsorbent fibers prepared via ATRP gave higher U adsorption capacities than the JAEA fiber prepared by RIGP (71.5 g/kg, tested under identical conditions).

While there have been shown and described what are at present considered the preferred embodiments of the invention, those skilled in the art may make various changes and modifications which remain within the scope of the invention defined by the appended claims.

What is claimed is:
1. A fiber useful in the absorption of metal ions from aqueous solutions, the fiber comprising a polyolefin backbone having a diameter of at least 1 micron and having covalently appended on its surface halogen atoms and vinyl-addition polymeric grafts functionalized with metal-binding groups.

2. The fiber of claim 1, wherein said metal-binding groups contain at least one functional group containing at least one heteroatom selected from nitrogen, oxygen, sulfur, and phosphorus.

3. The fiber of claim 1, wherein said metal-binding groups contain at least one functional group selected from carboxylate, hydroxy, keto, aldo, amino, imino, nitrile, amido, oxime, amidoxime, imide dioxime, and hydroxamate groups.

4. The fiber of claim 1, wherein said vinyl-addition polymeric grafts are further functionalized with hydrophilic groups different from said metal-binding groups.

5. The fiber of claim 4, wherein said hydrophilic groups are selected from carboxylate, alkoxy, sulfone, sulfonate, phosphonate, alkylammonium, iminium, amide, pyrrolidone, and polyalkyleneglycol groups.

6. The fiber of claim 1, wherein said metal-binding groups are selected from oxime, amidoxime, imide dioxime, and hydroxamate groups.

7. The fiber of claim 6, wherein said vinyl-addition polymeric grafts are further functionalized with hydrophilic groups selected from carboxylate, alkoxy, sulfone, sulfonate, phosphonate, alkylammonium, iminium, amide, pyrrolidone, and polyalkyleneglycol groups, in addition to said metal-binding groups.

8. The fiber of claim 7, wherein said metal-binding and hydrophilic groups are present in a metal-binding:hydrophilic group molar ratio of 2:1 to 1:2.

9. The fiber of claim 7, wherein said metal-binding and hydrophilic groups are present in a metal-binding:hydrophilic group molar ratio of 1.5:1 to 1:1.5.

10. A method of producing a fiber useful in the absorption of metal ions from aqueous solutions, the method comprising:
reacting a halogenated polyolefin precursor fiber having a diameter of at least 1 micron with vinylic monomers under conditions conducive to surface-initiated atom-transfer radical polymerization (ATRP), said conditions comprising contacting said halogenated polyolefin precursor fiber with said vinylic monomers in solution in the presence of an ATRP catalyst, wherein, during said ATRP reaction, at least a portion of the halogen atoms on said halogenated polyolefin precursor fiber are converted to radical initiation sites that initiate a radical-based vinyl-addition reaction with said vinylic monomers to form vinyl-addition polymeric grafts covalently attached to said halogenated polyolefin precursor fiber, wherein said vinylic monomers and resulting vinyl-addition polymeric grafts are functionalized with metal-binding groups;
wherein the resulting fiber containing said vinyl-addition polymeric grafts is useful in the absorption of metal ions and comprises a polyolefin backbone having a diameter of at least 1 micron and having covalently appended on its surface vinyl-addition polymeric grafts functionalized with metal-binding groups.

11. The method of claim 10, further comprising producing said halogenated polyolefin precursor fiber by halogenating a polyolefin fiber with halogen molecules $X_2$ in the presence of an irradiation source, wherein X represents Cl, Br, or I.

12. The method of claim 11, wherein said irradiation source is sunlight or artificial ultraviolet light.

13. The method of claim 11, wherein said halogen molecules are included in an amount of at least 10 wt % calculated as (weight of halogenated polymer)/(weight of polymer before halogenation)×100.

14. The method of claim 10, wherein said metal-binding groups contain at least one functional group containing at least one heteroatom selected from nitrogen, oxygen, sulfur, and phosphorus.

15. The method of claim 10, wherein said metal-binding groups contain at least one functional group selected from carboxylate, hydroxy, keto, aldo, amino, imino, nitrile, amido, oxime, amidoxime, imide dioxime, and hydroxamate groups.

16. The method of claim 10, wherein said vinylic monomers functionalized with metal-binding groups are admixed with vinylic monomers functionalized with hydrophilic groups different from said metal-binding groups, with the result that said vinyl-addition polymeric grafts are functionalized with said metal-binding groups and said hydrophilic groups.

17. The method of claim 16, wherein said hydrophilic groups are selected from carboxylate, alkoxy, sulfone, sulfonate, phosphonate, alkylammonium, iminium, amide, pyrrolidone, and polyalkyleneglycol groups.

18. The method of claim 10, wherein said vinylic monomers contain nitrile, aldehyde, or ketone groups as metal-binding groups; and said nitrile, aldehyde, or ketone groups, after incorporation into said vinyl-addition polymeric grafts by ATRP polymerization, are converted to amidoxime, imide dioxime, oxime, and/or hydroxamate groups by reaction with hydroxylamine.

19. The method of claim 18, wherein said vinylic monomers containing nitrile, aldehyde, or ketone groups as metal-binding groups are admixed with vinylic monomers functionalized with hydrophilic groups selected from carboxylate, hydroxy, sulfone, sulfonate, phosphonate, alkylammonium, iminium, amide, pyrrolidone, and polyalkyleneglycol groups, with the result that said vinyl-addition polymeric grafts produced by ATRP polymerization are functionalized with said amidoxime, imide dioxime, oxime, and/or hydroxamate groups and said hydrophilic groups.

20. The method of claim 19, wherein said metal-binding and hydrophilic groups are present in a metal-binding:hydrophilic group molar ratio of 2:1 to 1:2.

21. The method of claim 19, wherein said nitrile and hydrophilic groups are present in a metal-binding:hydrophilic group molar ratio of 1.5:1 to 1:1.5.

22. A method for extracting metal ions from a liquid solution containing metal ions, the method comprising contacting said liquid solution with fibers comprising a polyolefin backbone having a diameter of at least 1 micron and having covalently appended on its surface vinyl-addition polymeric grafts functionalized with metal-binding groups.

23. The method of claim 22, wherein said metal-binding groups contain at least one functional group containing at least one heteroatom selected from nitrogen, oxygen, sulfur, and phosphorus.

24. The method of claim 22, wherein said metal-binding groups contain at least one functional group selected from carboxylate, hydroxy, keto, aldo, amino, imino, nitrile, amido, oxime, amidoxime, imide dioxime, and hydroxamate groups.

25. The method of claim 22, wherein said vinyl-addition polymeric grafts are further functionalized with hydrophilic groups different from said metal-binding groups.

26. The method of claim 25, wherein said hydrophilic groups are selected from carboxylate, alkoxy, sulfone, sulfonate, phosphonate, alkylammonium, iminium, amide, pyrrolidone, and polyalkyleneglycol groups.

27. The method of claim 22, wherein said metal-binding groups comprise oxime, amidoxime, imide dioxime, and hydroxamate groups.

28. The method of claim 27, wherein said vinyl-addition polymeric grafts are further functionalized with hydrophilic groups selected from carboxylate, hydroxy, sulfone, sulfonate, phosphonate, alkylammonium, iminium, amide, pyrrolidone, and polyalkyleneglycol groups, in addition to said metal-binding groups.

29. The method of claim 28, wherein said metal-binding and hydrophilic groups are present in a metal-binding: hydrophilic group molar ratio of 2:1 to 1:2.

30. The method of claim 28, wherein said metal-binding and hydrophilic groups are present in a metal-binding: hydrophilic group molar ratio of 1.5:1 to 1:1.5.

31. The method of claim 22, wherein said metal ions are selected from transition, lanthanide, and actinide metal ions.

* * * * *